US012457466B2

(12) United States Patent
Zhang et al.

(10) Patent No.: US 12,457,466 B2
(45) Date of Patent: Oct. 28, 2025

(54) AUDIO CONTROL METHOD, CONTROL DEVICE, DRIVING CIRCUIT AND READABLE STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventors: Lianghao Zhang, Beijing (CN); Zhaoyun Gu, Beijing (CN); Yaqian Ji, Beijing (CN); Wenchao Han, Beijing (CN); Xin Duan, Beijing (CN); Shuhuan Yu, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/245,592

(22) PCT Filed: May 31, 2022

(86) PCT No.: PCT/CN2022/096380
§ 371 (c)(1),
(2) Date: Mar. 16, 2023

(87) PCT Pub. No.: WO2023/230886
PCT Pub. Date: Dec. 7, 2023

(65) Prior Publication Data
US 2024/0298132 A1 Sep. 5, 2024

(51) Int. Cl.
*H04S 7/00* (2006.01)
*H04R 1/02* (2006.01)
(Continued)

(52) U.S. Cl.
CPC ............ *H04S 7/302* (2013.01); *H04R 1/028* (2013.01); *H04R 5/02* (2013.01); *H04R 5/04* (2013.01);
(Continued)

(58) Field of Classification Search
CPC .. H04S 7/302; H04S 2400/11; H04S 2400/13; H04R 1/028; H04R 5/02; H04R 5/04; H04R 2499/15
See application file for complete search history.

(56) References Cited

U.S. PATENT DOCUMENTS

2010/0111336 A1 5/2010 Jeong et al.
2010/0119092 A1 5/2010 Kim et al.
(Continued)

FOREIGN PATENT DOCUMENTS

CN 104036789 A 9/2014
CN 107656718 A 2/2018
(Continued)

OTHER PUBLICATIONS

Translation of KR20100049836A Young et al. (Year: 2010).*
(Continued)

*Primary Examiner* — Andrew Sniezek
(74) *Attorney, Agent, or Firm* — LEASON ELLIS LLP

(57) ABSTRACT

An audio control method, a control device, a driving circuit and a readable storage medium are provided. The audio control method according to some embodiments of the present disclosure is applicable to the display screen configured with M speakers, and the method includes: obtaining a sound image coordinate of a sound object relative to the display screen; determining N speakers from the M speakers as loudspeakers according to the sound image coordinate and position coordinates of the M speakers relative to the display screen; determining output gains of the N loudspeak-
(Continued)

ers according to distances between the N loudspeakers and a viewer of the display screen and sound attenuation coefficients; and calculating output audio data of the sound object in the display screen according to audio data of the sound object and the output gains of the N loudspeakers, and controlling the M speakers to play the output audio data.

20 Claims, 13 Drawing Sheets

(51) Int. Cl.
*H04R 5/02* (2006.01)
*H04R 5/04* (2006.01)

(52) U.S. Cl.
CPC ....... *H04R 2499/15* (2013.01); *H04S 2400/11* (2013.01); *H04S 2400/13* (2013.01)

(56) References Cited

U.S. PATENT DOCUMENTS

| | | | |
|---|---|---|---|
| 2016/0104491 | A1 | 4/2016 | Lee et al. |
| 2016/0330512 | A1 | 11/2016 | Du et al. |
| 2019/0045303 | A1 | 2/2019 | Zhang |
| 2021/0306752 | A1 | 9/2021 | Yoshida et al. |
| 2022/0086587 | A1 | 3/2022 | Honma et al. |

FOREIGN PATENT DOCUMENTS

| | | | | |
|---|---|---|---|---|
| CN | 108806560 | A | 11/2018 | |
| CN | 109194999 | A | 1/2019 | |
| CN | 109862293 | A | 6/2019 | |
| CN | 110572494 | A | 12/2019 | |
| CN | 110968235 | A | 4/2020 | |
| CN | 111641865 | A | 9/2020 | |
| CN | 113302950 | A | 8/2021 | |
| CN | 113810837 | A | 12/2021 | |
| CN | 114063965 | A | 2/2022 | |
| CN | 114065706 | A | 2/2022 | |
| CN | 114090848 | A | 2/2022 | |
| EP | 3737087 | A1 | 11/2020 | |
| KR | 20100049836 | A * | 5/2010 | ............... H04R 5/04 |

OTHER PUBLICATIONS

Jose J. Lopez et al., “Sound Distance Perception Comparison Between Wave Field Synthesis and Vector Base Amplitude Panning”, 6th International Symposium on Communications, Control and Signal Processing (ISCCSP), 2014.

* cited by examiner

AUDIO CONTROL METHOD, CONTROL DEVICE, DRIVING CIRCUIT AND READABLE STORAGE MEDIUM

CROSS-REFERENCE TO RELATED PATENT APPLICATIONS

This application is a U.S. National Stage Application under 35 U.S.C. § 371 of International Patent Application No. PCT/CN2022/096380 filed May 31, 2022, which is incorporated by reference in its entirety.

TECHNICAL FIELD

The present disclosure relates to the technical field of screen sound generation, and more specifically, to an audio control method, a control device, a driving circuit and a readable storage medium.

BACKGROUND

With the continuous development of display technology, the display screen is becoming larger and larger, and the mismatch between the supporting sound system and the large screen image is becoming more and more serious, which cannot achieve the audio-visual effect of sound and picture integration, and reduces user experience. In some application scenarios, the screen sound generation technology alleviates this problem by arranging multiple speakers under the display screen. However, the existing screen sound generation technology is only based on the traditional two-channel and three-channel audio playback technology, which is difficult to further improve the audio-visual effect of the sound and picture integration.

SUMMARY

Some embodiments of the present disclosure provide an audio control method, a control device, a driving circuit and a readable storage medium for improving the sound and picture integration effect of the screen sound system.

According to an aspect of the present disclosure, an audio control method is provided, the method is applicable to a display screen configured with M speakers, wherein, M is an integer greater than or equal to 2, and the method comprises: obtaining a sound image coordinate of a sound object relative to the display screen; determining N speakers from the M speakers as loudspeakers according to the sound image coordinate and position coordinates of the M speakers relative to the display screen, wherein N is an integer less than or equal to M; determining output gains of the N loudspeakers according to distances between the N loudspeakers and a viewer of the display screen and sound attenuation coefficients; and calculating output audio data of the sound object in the display screen according to audio data of the sound object and the output gains of the N loudspeakers, and controlling the M speakers to play the output audio data.

According to some embodiments of the present disclosure, determining the N speakers from the M speakers as the loudspeakers comprises: calculating distances between the position coordinates of the M speakers and the sound image coordinate, and determining 3 speakers with nearest distances as the loudspeakers, wherein N=3.

According to some embodiments of the present disclosure, determining the output gains of the N loudspeakers according to the distances between the N loudspeakers and the viewer of the display screen and the sound attenuation coefficients comprises: obtaining N vectors pointed from the viewer to the N loudspeakers; updating vector modulus of the N vectors based on differences between the vector modulus of the N vectors, and using a vector-base amplitude panning algorithm to calculate N initial gains based on updated N vectors; and obtaining N sound attenuation coefficients respectively based on the vector modulus of the N vectors, and obtaining N output gains based on a product of the N sound attenuation coefficients and the N initial gains.

According to some embodiments of the present disclosure, updating the vector modulus of the N vectors based on the differences between the vector modulus of the N vectors, and using the vector-base amplitude panning algorithm to calculate the N initial gains based on the updated N vectors, comprises: determining a loudspeaker with a largest vector modulus among the N vectors of the N loudspeakers, wherein the loudspeaker with the largest vector modulus is represented as a first loudspeaker, a vector modulus of the first loudspeaker is represented as a first vector modulus, and loudspeakers other than the first loudspeaker among the N loudspeakers are represented as second loudspeakers; obtaining extended vectors based on vector directions of the second loudspeakers and the first vector modulus; and calculating N initial gains based on a vector of the first loudspeaker and the extended vectors of the second loudspeakers according to the vector-base amplitude panning algorithm.

According to some embodiments of the present disclosure, obtaining the N sound attenuation coefficients respectively based on the vector modulus of the N vectors comprises: for each of the second loudspeakers, calculating a difference d between vector modulus of the second loudspeakers and the first vector modulus, and calculating a sound attenuation coefficient k according to k=20 log(10, d) based on the difference d; and setting a sound attenuation coefficient of the first loudspeaker to be 0.

According to some embodiments of the present disclosure, the M speakers are equally spaced in the display screen in a form of matrix.

According to some embodiments of the present disclosure, calculating the output audio data of the sound object in the display screen according to the audio data of the sound object and the output gains of the N loudspeakers, and controlling the M speakers to play the output audio data, comprises: setting output gains of speakers other than the N loudspeakers among the M speakers to be 0; and multiplying the audio data with output gains of the M speakers respectively, to obtain output audio data comprising M audio components, and controlling the M speakers to output one of corresponding M audio components respectively.

According to some embodiments of the present disclosure, multiplying the audio data with the output gains of the M speakers respectively comprises: delaying the audio data for a predetermined time interval, and multiplying delayed audio data with the output gains of the M speakers.

According to some embodiments of the present disclosure, obtaining the sound image coordinate of the sound object relative to the display screen comprise: making video data comprising the sound object, wherein the sound object is controlled to move, wherein the display screen is used to output the video data; and recording moving track of the sound object to obtain the sound image coordinate.

According to another aspect of the present disclosure, an audio control device is provided, the device is applicable for a display screen equipped with M speakers, M is an integer greater than or equal to 2, and the device comprises: a sound image coordinate unit which is configured to obtain a sound image coordinate of a sound object relative to the display screen; a coordinate comparison unit which is configured to determine N speakers from the M speakers as loudspeakers according to the sound image coordinate and position coordinates of the M speakers relative to the display screen, wherein, N is an integer less than or equal to M; a gain calculation unit which is configured to determine output gains of the N loudspeakers according to distances between the N loudspeakers and a viewer of the display screen and sound attenuation coefficients; and an output unit which is configured to calculate output audio data of the sound object in the display screen according to audio data of the sound object and the output gains of the N loudspeakers, and controlling the M speakers to play the output audio data.

According to some embodiments of the present disclosure, determining the N speakers from the M speakers as the loudspeakers by the coordinate comparison unit comprises: calculating distances between the position coordinates of the M speakers and the sound image coordinate, and determining 3 speakers with nearest distances as the loudspeakers, wherein N=3.

According to some embodiments of the present disclosure, determining the output gains of the N loudspeakers according to the distances between the N loudspeakers and the viewer of the display screen and the sound attenuation coefficients by the gain calculation unit comprises: obtaining N vectors pointed from the viewer to the N loudspeakers; updating vector modulus of the N vectors based on differences between the vector modulus of the N vectors, and using a Vector-Base Amplitude Panning (VBAP) algorithm to calculate N initial gains based on updated N vectors; and obtaining N sound attenuation coefficients respectively based on the vector modulus of the N vectors, and obtaining N output gains based on a product of the N sound attenuation coefficients and the N initial gains.

According to some embodiments of the present disclosure, updating the vector modulus of the N vectors based on the differences between the vector modulus of the N vectors, and using the vector-base amplitude panning algorithm to calculate the N initial gains based on the updated N vectors by the gain calculation unit, comprises: determining a loudspeaker with a largest vector modulus among the N vectors of the N loudspeakers, wherein the loudspeaker with the largest vector modulus is represented as a first loudspeaker, a vector modulus of the first loudspeaker is represented as a first vector modulus, and loudspeakers other than the first loudspeaker among the N loudspeakers are represented as second loudspeakers; obtaining extended vectors based on vector directions of the second loudspeakers and the first vector modulus; and calculating N initial gains based on a vector of the first loudspeaker and the extended vectors of the second loudspeakers according to the vector amplitude translation algorithm.

According to some embodiments of the present disclosure, obtaining the N sound attenuation coefficients respectively based on the vector modulus of the N vectors by the gain calculation unit comprises: for each of the second loudspeakers, calculating a difference d between vector modulus of the second loudspeakers and the first vector modulus, and calculating a sound attenuation coefficient k according to k=20 log(10, d) based on the difference d; and setting a sound attenuation coefficient of the first loudspeaker to be 0.

According to some embodiments of the present disclosure, the M speakers are equally spaced in the display screen in a form of matrix.

According to some embodiments of the present disclosure, calculating the output audio data of the sound object in the display screen according to the audio data of the sound object and the output gains of the N loudspeakers, and controlling the M speakers to play the output audio data by the output unit comprises: setting output gains of speakers other than the N loudspeakers among the M speakers to be 0; and multiplying the audio data with output gains of the M speakers respectively, to obtain output audio data comprising M audio components, and controlling the M speakers to output one of corresponding M audio components respectively.

According to some embodiments of the present disclosure, multiplying the audio data with the output gains of the M speakers respectively by the output unit comprises: delaying the audio data for a predetermined time interval, and multiplying delayed audio data with the output gains of the M speakers.

According to some embodiments of the present disclosure, obtaining the sound image coordinate of the sound object relative to the display screen by the sound image coordinate unit comprises: making video data comprising the sound object, wherein the sound object is controlled to move, wherein the display screen is used to output the video data; and recording moving track of the sound object to obtain the sound image coordinate.

According to another aspect of the present disclosure, a driving circuit based on multi-channel splicing screen sound system is provided, the driving circuit comprises: a multi-channel sound card which is configured to receive sound data, wherein the sound data comprises sound channel data and sound image data, wherein, the sound image data comprises audio data and a coordinate of a sound object; an audio control circuit which is configured to obtain output audio data of the sound object in the display screen according to the audio control method described above; and a sound standard unit, wherein the sound standard unit comprises a power amplifier board and a screen sound components, and the sound standard unit is configured to output the channel data and the output audio data.

According to another aspect of the present disclosure, a non-volatile computer-readable storage medium is provided, on which instructions are stored, wherein the instructions causes the processor to execute the audio control method described above when executed by the processor.

Using the audio control method, control device, driving circuit and readable storage medium according to some embodiments of the present disclosure, the position of loudspeakers can be accurately determined according to the acoustic image coordinate of the sound object and the coordinates of a plurality of speakers, and further, gains of determined loudspeakers can be adjusted according to the position of the viewer and the sound attenuation coefficients, so as to improve the audio-visual effect of the sound and picture integration on the large screen, which can better realize the surround stereo experience for the sound object, and help to improve the viewing experience of large-screen users.

BRIEF DESCRIPTION OF THE DRAWINGS

In order to more clearly illustrate the technical solutions in the embodiments of the present disclosure or those in the prior art, the following will briefly introduce the drawings used in the embodiments or the description of the prior art. It is obvious that the drawings in the following description are only some embodiments of the present disclosure. For those skilled in the art, other drawings can also be obtained from these drawings without creative work.

DETAILED DESCRIPTION

Figure 1:
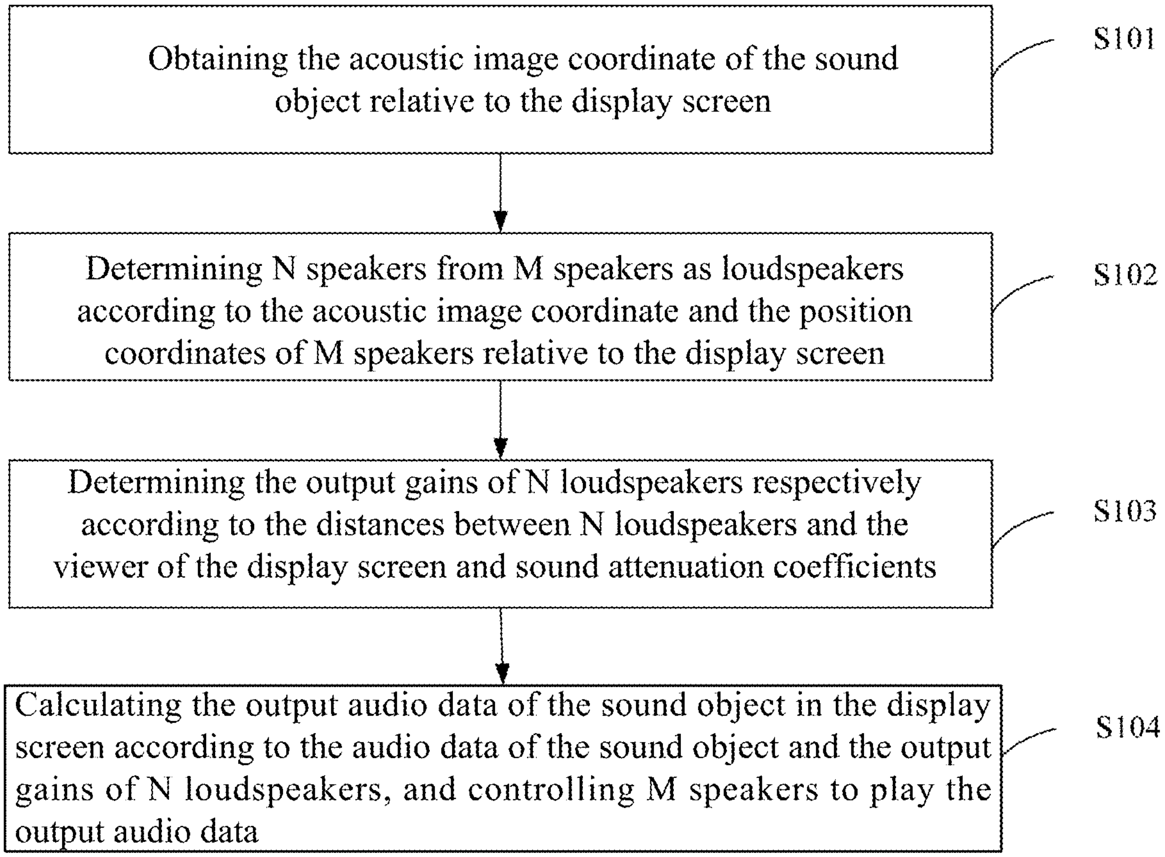
FIG. 1 is a schematic flowchart of an audio control method according to the embodiment of the present disclosure.

The technical solution in the embodiment of the present disclosure will be described clearly and completely below in combination with the drawings in the embodiment of the present disclosure. Obviously, the described embodiments are only a part of the embodiments of the present disclosure, not all of them. Based on the embodiments in the present disclosure, all other embodiments obtained by those skilled in the art without creative work fall within the protection scope the present disclosure.

The "first", "second" and similar words used in the present disclosure do not indicate any order, quantity or importance, but are only used to distinguish different components. Similarly, similar terms such as "comprising" or "comprise" mean that the elements or objects appearing before the word cover the elements or objects listed after the word and their equivalents, without excluding other elements or objects. Similar terms such as "connecting" or "connection" are not limited to physical or mechanical connections, but can comprise electrical connections, whether direct or indirect.

A flowchart is used in the present disclosure to illustrate the steps of the method according to the embodiment of the present disclosure. It should be understood that the previous or subsequent steps are not necessarily carried out in order. Instead, various steps can be processed in reverse order or at the same time. At the same time, other operations can also be added to these processes. It can be understood that the professional terms and phrases involved in this article have the meanings known to those skilled in the art.

With the rapid development of display technology, the size of display screen is becoming larger and larger, which is used to meet the needs of application scenarios such as large-scale exhibitions for example. For the display screen with large display size, the mismatch between the supporting sound system and the large screen display is becoming more and more serious, and the playback effect of the sound and picture integration cannot be achieved. Specifically, the sound and picture integration can mean that the display pictures of the display screen are consistent with the played sound, or it can be called sound and picture synchronization. The display effect of the sound and picture integration can enhance the realism of pictures and improve the appeal of visual images.

Screen sound generation technology is used to solve the technical problem that large display screen is difficult to achieve the sound and picture integration. However, the existing screen sound generation technology still relies on the traditional two-channel or three-channel technology, but this technology does not completely solve the problem that the sound and picture cannot be integrated in applications of large screen size. Therefore, more accurate sound positioning system and more screen loudspeakers are needed to achieve the sound and picture integration. The existing screen sound system does not meet the scheme of multi-channel circuit driving. Although it can be spliced according to the scheme of two-channel circuit driving, this kind of splicing can only achieve an increase in number. There is no way to control the sound position and sound effect in real time according to film source contents to achieve better sound and picture integration effect.

Some embodiments of the present disclosure propose an audio control method, which is applicable to a display screen configured with multiple speakers. For example, speakers can be arranged below the display screen in an array structure to solve the problem that the sound and picture of the multi-channel screen cannot be integrated. As an example, the audio control method according to some embodiments of the present disclosure can be implemented in the multi-channel screen sound generation driving circuit to carry out audio driving control for the display screen configured with multiple under-screen speakers. Specifically, the audio control method can control the number and position of speakers in real time according to the position of the sound object, and control output gains of loudspeakers, to achieve better audio-visual experience. In addition, the audio control method according to the embodiment of the present disclosure can also be combined with an audio splicing unit to realize channel splicing, and can splice any number of channels in real time according to user needs.

Figure 2:
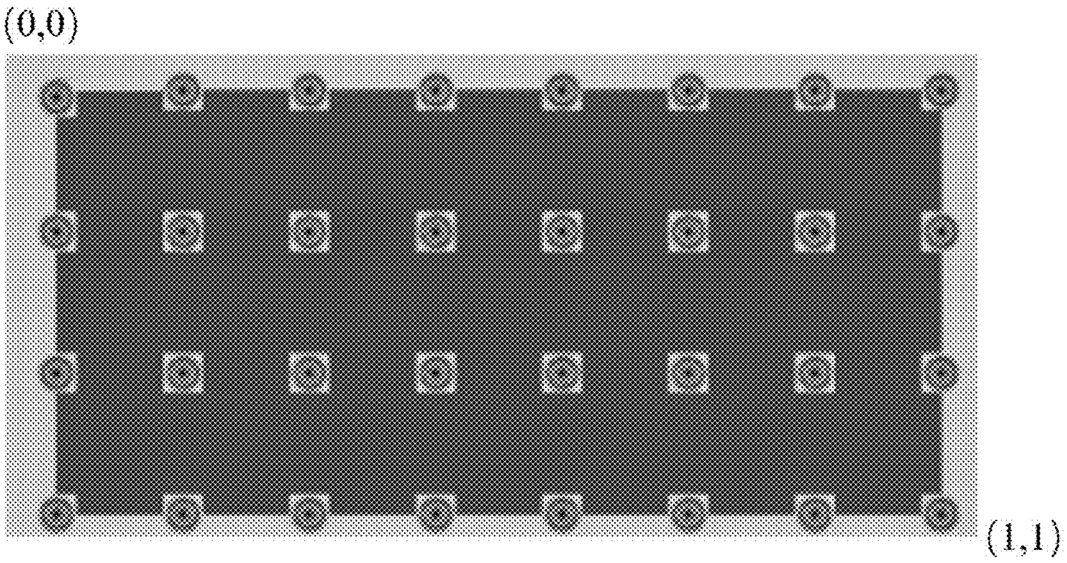
FIG. 2 is a schematic diagram of a display screen that is configured with 32 under-screen speakers.

FIG. 1 is a schematic flowchart of the audio control method according to the embodiment of the present disclosure. As shown in FIG. 1, first, in step S101, an acoustic image coordinate of a sound object relative to a display screen is obtained. The sound object can be understood as an object that is making sound displayed in the screen, for example, it can be a character image or other objects that need to make sound. The audio control method according to some embodiments of the present disclosure is applicable to the display screen configured with M speakers, where M is an integer greater than or equal to 2. As an example, in a case of being applied to the display screen with screen sound generation technology, M speakers are arranged below the display screen. As an example, FIG. 2 is a schematic diagram of a display screen configured with 32 under-screen speakers, that is, M=32. As shown in FIG. 2, 32 speakers are equally spaced in the display screen in a form of matrix. It can be understood that M can also be other values. In addition, the layout of speakers in the display screen can also take other forms, such as unequally spaced layout, which is not limited here. In addition, the display screen shown in FIG. 2 is only one of the application scenarios of the audio control method according to the embodiment of the present disclosure. The audio control method can also be applied to other types of display screens, for example, speakers can also be arranged around the display screen, which is not limited here. In the following, the specific implementation process of the audio control method according to the embodiment of the present disclosure will be described with the display screen shown in FIG. 2 as an application scenario.

Specifically, in step S101, the acoustic image coordinate of the sound object relative to the display screen can be understood as the coordinate of the sound object in the coordinate system relative to the display screen. For example, as shown in FIG. 2, in the coordinate system relative to the display screen, the coordinate of the point in the upper left corner of the display screen is (0, 0), and the coordinate of the point in the lower right corner of the display screen is (1, 1). Based on the coordinate of the sound object in the coordinate system relative to the display screen, the position of the sound object that currently make sound in the display screen can be recognized, so that a specific speaker can be selected for it to make sound based on the position of the sound object.

Next, as shown in FIG. 1, in step S102, according to the acoustic coordinate and the position coordinates of M speakers relative to the display screen, N speakers are determined from the M speakers as loudspeakers, where N is an integer less than or equal to M. In this step, because the arrangement of speakers relative to the display screen can be predicted, for example, the layout form shown in FIG. 2, the relative position of each speaker of 32 speakers in the display screen can be directly obtained, and according to known positions of speakers and the sound object, a part of speakers can be determined from the 32 speakers as loudspeakers, that is, for playing the audio data corresponding to the sound object to form the sound and picture synchronization effect for the sound object, for example, to enable the viewer to feel the sound surrounding the sound object while watching display pictures.

According to some embodiments of the present disclosure, the steps to determine the loudspeakers can comprise: calculating distances between the position coordinates and the acoustic image coordinates of M speakers, and determining 3 speakers with nearest distances as loudspeakers, where N=3. In these embodiments, loudspeakers are selected based on distances, and the 3 speakers that are closest to the sound object are determined as the loudspeakers. It can be understood that the number of loudspeakers can also be other values.

Next, in step S103, output gains of N loudspeakers are determined respectively according to the distances between N loudspeakers and the viewer of the display screen and the sound attenuation coefficients. And, in step S104, the output audio data of the sound object in the display screen is calculated according to the audio data of the sound object and the output gains of N loudspeakers, and M speakers are controlled to play the output audio data.

According to the embodiment of the present disclosure, after determining N loudspeakers according to the distances, the gains of the loudspeakers are finely adjusted by further taking into account the position of the viewer relative to the display screen and the attenuation change of the sound. For example, the gains of N loudspeakers are set to different values, even if the sound intensities of the loudspeakers at different positions of the sound object are different, the audio-visual effect of the sound and picture integration is strengthened. The specific process of calculating output gains will be described in detail below.

In order to clearly understand the process of determining the output gains of the loudspeakers in the audio control method according to the embodiment of the present disclosure, the implementation process of the Vector-Base Amplitude Panning (VBAP) algorithm is first introduced. The VBAP algorithm is a method used to reproduce the 3D stereo effect by using multiple speakers and based on the position of the sound object in a 3D stereo scenario. According to the VBAP algorithm, 3 speakers can be used to reproduce the sound object, where the gain of each speaker corresponds to the position of the sound object.

Figure 3:
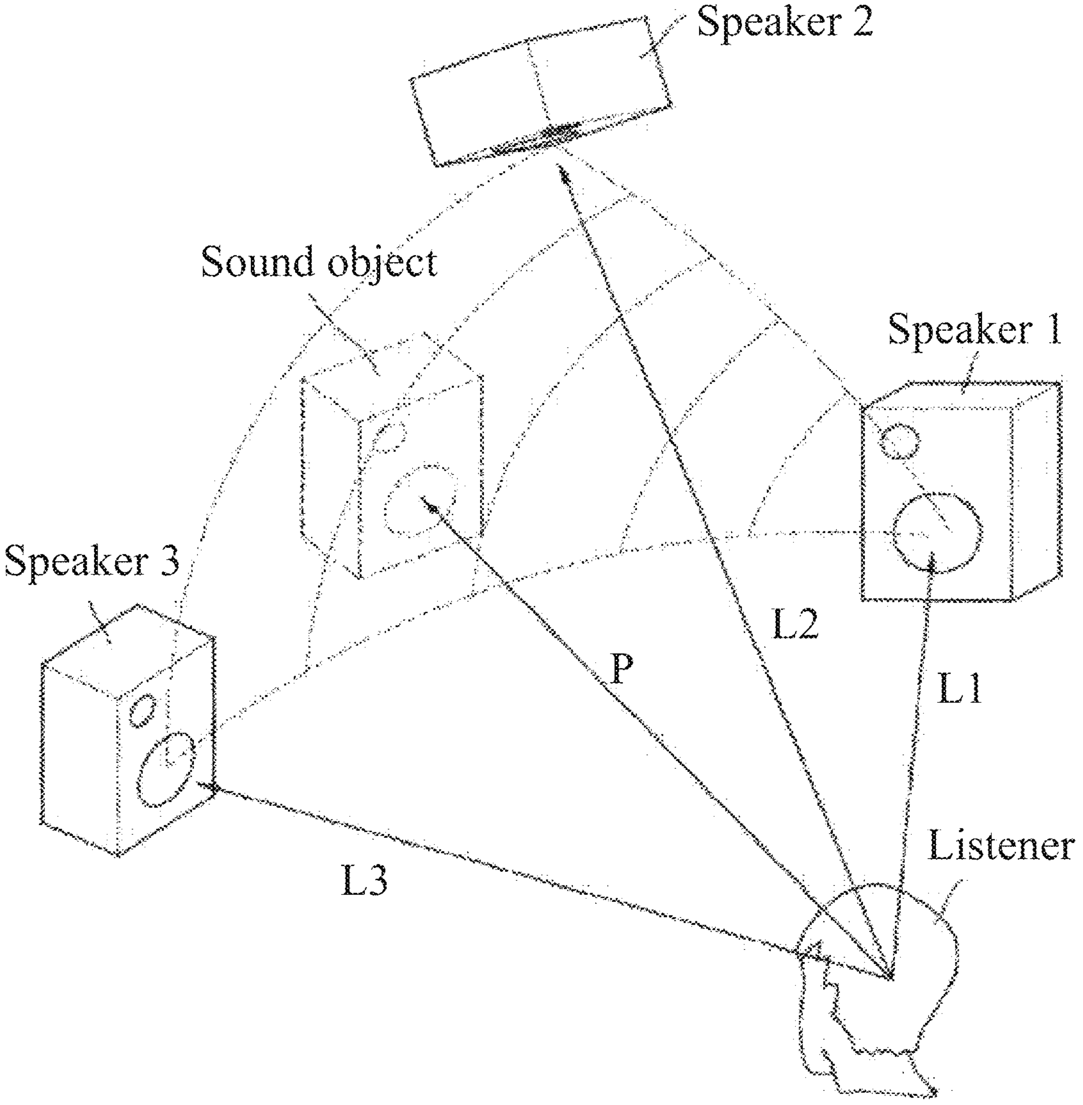
FIG. 3 shows three-dimensional position relationship between a sound object and 3 speakers.

As an example, FIG. 3 shows the three-dimensional position relationship between a sound object and 3 speakers. Referring to FIG. 3, 3 speakers are arranged around the sound object, namely speaker 1, speaker 2 and speaker 3 respectively, and the positions of the 3 speakers are indicated by position vectors L1, L2 and L3 respectively. The vector directions of the vectors L1, L2 and L3 are directed from the listener to the speaker. In the VBAP algorithm, the position of the sound object and the positions of the 3 speakers are located on a same sphere, and the listener is located at the center of the sphere, whose distance from the speaker is radius r.

In addition, the position vector P indicating the position of the sound object is expressed as P=[P1, P2, P3], where P1, P2 and P3 represent the three-dimensional coordinates of the sound object respectively. Similarly, vectors L1, L2 and L3 can be expressed as L1=[L11, L12, L13], L2=[L21, L22, L23], L3=[L31, L32, L33], respectively.

Assuming that the gains of the 3 speakers corresponding to the position vectors L1, L2 and L3 are expressed as g1, g2 and g3 respectively, the following formula (1) should be met:

$$P = g1 * L1 + g2 * L2 + g3 * L3 \tag{1}$$

Therefore, according to the following formula (2), the gain of each speaker can be calculated from the position vector P of the sound object and the position vectors L1, L2 and L3 of the speaker.

$$g = [g1, g2, g3] = [p1, p2, p3]\begin{bmatrix} L11 & L12 & L13 \\ L21 & L22 & L23 \\ L31 & L32 & L33 \end{bmatrix}^{-1} \quad (2)$$

After calculating the gain of each speaker, the audio signal of the sound object is multiplied with gains respectively and the results are played, so that the listener can obtain stereo surround effect. It can be understood that in the VBAP algorithm shown in FIG. 3 above, the position of the sound object and the positions of 3 speakers need to be arranged on the same sphere. However, in an actual display screen, such as the display screen based on the screen sound generation technology shown in FIG. 2, the sound object and the speakers are all in the same plane, and the position of the sound object and that of the listener cannot form a sphere. If the gains are still calculated according to the above formula (2) to play the sound, it will be difficult to achieve accurate sound and picture integration effect.

According to some embodiments of the present disclosure, determining the output gains of N loudspeakers respectively according to the distances between N loudspeakers and the viewer of the display screen and the sound attenuation coefficients (S103), comprises: S1031, obtaining N vectors pointing from the viewer to N loudspeakers; S1032, updating the vector modulus of N vectors based on the differences between the vector modulus of N vectors, and using the VBAP algorithm to calculate N initial gains based on the updated N vectors; S1033, obtaining N sound attenuation coefficients based on the vector modulus of N vectors respectively, and obtaining N output gains based on the products of N sound attenuation coefficients and N initial gains. Specifically, N=3 will be described as an example.

Figure 4:
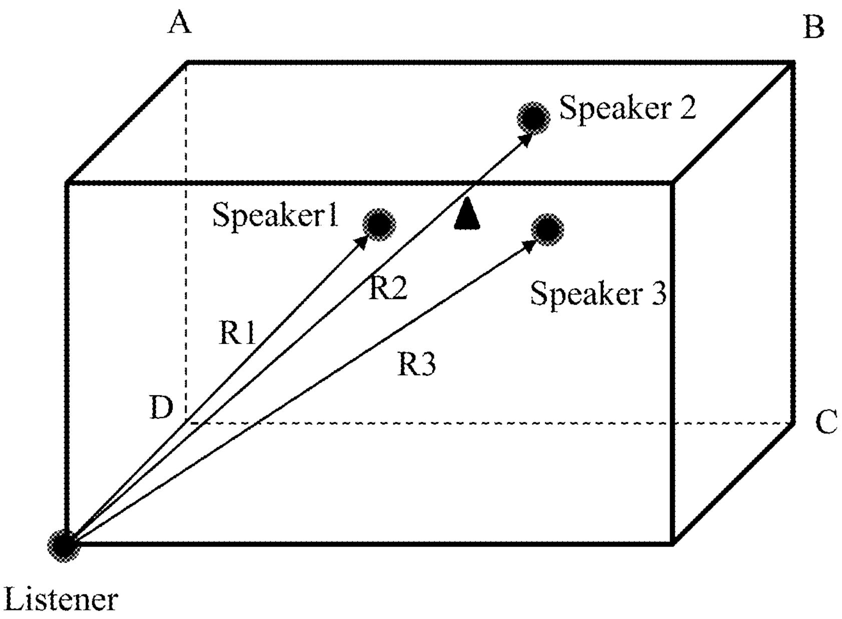
FIG. 4 shows position relationship between 3 loudspeakers and a sound object in a plane where a display screen is located.

In order to facilitate understanding, FIG. 4 is provided to show the position relationship between the 3 loudspeakers and the sound object located in the plane where the display screen is located. In FIG. 4, vertices of the display screen are shown as points A, B, C and D, 3 speakers are shown as circles, and the sound object is shown as a triangle.

In the above step S1031, 3 vectors of the selected t3 loudspeakers will be obtained first, as shown in FIG. 4. The 3 vectors are R1, R2 and R3 respectively, and whose directions are pointing to the speakers with the listener as the starting point. In the example shown in FIG. 4, in order to show stereoscopic effect, the listener is arranged at an extension line at the lower left corner of the display screen ABCD. It can be understood that in actual application processes, the listener can also be arranged at the middle position directly in front of the display screen, which is not limited here. The difference of the listener's position only involves the transformation of the position coordinates, which is not limited here.

In step S1032 above, the vector modulus of 3 vectors are updated based on the differences between the vector modulus of 3 vectors, and the VBAP algorithm shown in formula (2) above is used to calculate 3 initial gains based on the updated 3 vectors. Specifically, the process of obtaining initial gains can be described as steps: S10321, determining the loudspeaker with the largest vector modulus among N vectors of N loudspeakers, wherein, the loudspeaker with the largest vector modulus is represented as the first loudspeaker, and the vector modulus of the first loudspeaker is represented as the first vector modulus, the loudspeakers other than the first loudspeaker among N loudspeakers are represented as the second loudspeakers. For example, referring to FIG. 4, the vector modulus of vector R2 of speaker 2 is the largest, that is, speaker 2 is the farthest from the listener. Based on this, speaker 2 can be represented as the first loudspeaker, the vector modulus R2 of the first loudspeaker can be represented as the first vector modulus, and the loudspeakers among the 3 loudspeakers other than the first loudspeaker can be represented as the second loudspeakers, which correspond to speaker 1 and speaker 3 in FIG. 4.

Next, S10322, obtaining the extended vector based on the vector direction of the second loudspeaker and the first vector modulus. That is to say, for speaker 1 and speaker 3 which are close to the listener, the modulus of their vectors are extended until the distances between them and the listener are equal to the distance between speaker 2 and the listener, and the vector directions are unchanged. Therefore, the distances between the extended speaker 1 and the listener is the same with the distance between the extended speaker 3 and the listener and the distance between speaker 2 and the listener, that is, all these distances are equal to the vector modulus R2, so that the position relationship between the updated speakers 1-3 and the listener meets the spherical relationship shown in FIG. 3, and the listener is located at the center of the sphere.

Next, S1033, calculating N initial gains based on the vector of the first loudspeaker and the extended vectors of the second loudspeakers according to the VBAP algorithm. The process of calculating the initial gains can be carried out with reference to the above formula (2).

According to the embodiment of the present disclosure, after obtaining the initial gains, the sound attenuation coefficients will also be calculated for the loudspeakers, and the calculated initial gains will be adjusted based on the sound attenuation coefficients. According to some embodiments of the present disclosure, obtaining N sound attenuation coefficients based on the vector modulus of N vectors comprises: for each of the second loudspeakers, calculating the difference d between the vector modulus of the second loudspeakers and the first vector modulus, and calculating the sound attenuation coefficient k according to k=20 log(10, d) based on the difference d. Specifically, in the example of FIG. 4, the second loudspeakers are speaker 1 and speaker 3. For example, for speaker 1, the difference between the vector modulus R1 of speaker 1 and the first vector modulus R2 is d1, and the sound attenuation coefficient k1 for speaker 1 is obtained according to k1=20 log(10, d1). Similarly, for speaker 3, the difference between the vector modulus R3 of speaker 3 and the first vector modulus R2 is d3, and the sound attenuation coefficient k3 for speaker 3 is obtained according to k3=20 log(10, d3). In addition, for speaker 2 that has not been extended, its sound attenuation coefficient can be set to 0. Then, 3 output gains are obtained based on the products of the obtained 3 sound attenuation coefficients and the calculated 3 initial gains.

It can be understood that in the process of calculating the initial gains above, the vector modulus of speaker 1 and speaker 3 have been extended, so that the calculated initial gains do not conform to the real position relationship between the speakers and the screen. Therefore, the sound attenuation will be calculated for the extended speakers, and the initial gains will be adjusted based on the calculated sound attenuation information to obtain the final output gain, which can make the audio playback effect of the 3 loudspeakers more satisfying for the audio-visual experience of the sound and picture integration.

According to some embodiments of the present disclosure, calculating the output audio data of the sound object in the display screen according to the audio data of the sound object and the output gains of the N loudspeakers, and controlling M speakers to play the output audio data (S104) comprises: setting the output gains of the speakers other than the N loudspeakers in the M speakers to 0; and multiplying the audio data with the output gains of M speakers respectively to obtain the output audio data comprising M audio components, and controlling the M speakers to output one of the corresponding M audio components respectively.

As an example, for the 32 speakers in the display screen as shown in FIG. 2, 3 loudspeakers are first selected based on the distance from the sound object, and the output gains of the 3 loudspeakers are calculated respectively according to the process described above. For other speakers that are not selected, the audio data related to the sound object will not be emitted. Therefore, the output gains of these speakers can be set to equal to 0. Then, the audio data of the sound object can be multiplied with the output gains of 32 speakers respectively to obtain their respective audio components, and then played by the speakers. The process of multiplying the audio data with the output gains respectively is shown as the following formula (3):

$$\text{Audio1} * \begin{bmatrix} \text{Gain1\_1} \\ \text{Gain1\_2} \\ \vdots \\ \text{Gain1\_32} \end{bmatrix} = \begin{bmatrix} \text{Audio1\_1} \\ \text{Audio1\_2} \\ \vdots \\ \text{Audio1\_32} \end{bmatrix} \quad (3)$$

In formula (3), Audio1 represents the audio data of the sound object, and gains Gain1_1 to Gain1_32 represent the output gains of 32 speakers in the display screen respectively, wherein only the output gains of the selected loudspeakers have specific values, while the output gains of other speakers are 0. After the multiplication process of formula (3) above, the audio components corresponding to 32 speakers respectively will be obtained for playback.

According to some embodiments of the present disclosure, before multiplying the audio data with the output gains of M speakers respectively, the audio data of the sound object can also be delayed for a predetermined time interval, and the delayed audio data can be multiplied with the output gains of M speakers. In actual applications, the acoustic image coordinate and audio data of the sound object are obtained synchronously, and a certain time delay is generated in the process of calculating the output gains according to the above steps S102-S103. Therefore, the synchronously received audio data can be delayed for a certain time interval to avoid the phenomenon of non-synchronization.

Figure 5:
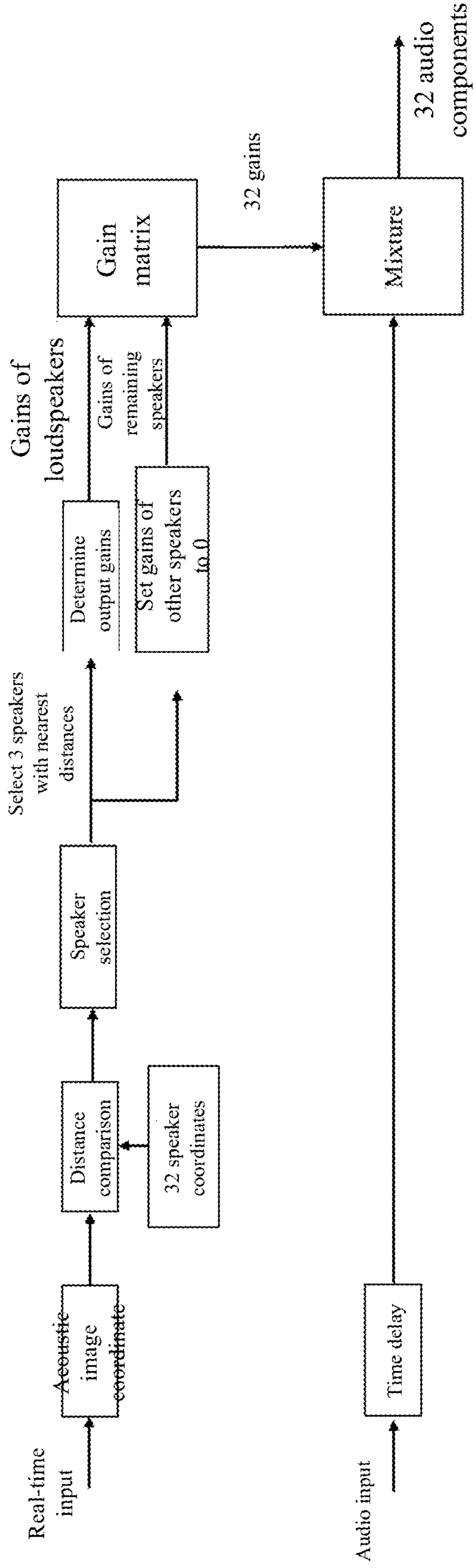
FIG. 5 is a schematic diagram of an implementation process of the audio control method according to some embodiments of the present disclosure.

FIG. 5 is a schematic diagram of the implementation process of the audio control method according to some embodiments of the present disclosure. The overall flow of the audio control method used to achieve the sound and picture integration will be described below in combination with FIG. 5.

In the method according to the present disclosure, the information of the sound object is processed, and the information of the sound object is divided into audio data (Audio) and position information. For example, position information and audio data Audio can be obtained synchronously. For example, the audio control method according to the embodiment of the present disclosure can be implemented in the audio control circuit, and the audio control will simultaneously receive audio data and position information for a certain audio object. For the position information, it can be expressed as the acoustic image coordinate of the sound object relative to the display screen.

As shown in FIG. 5, the received position information first enters the acoustic image coordinate module for coordinate identification and configuration. In order to save power consumption, the location information will not maintain the same frequency as the audio data Audio. As an example, the audio data Audio is generally 48 KHz, and the location information is input into the audio control circuit according to the actual video scenario. If the location of the sound object remains unchanged, only one location information (for example, acoustic image coordinate) can be input, which will not be updated later until the position of the sound object will change, that is, a new acoustic image coordinate is input.

According to some embodiments of the present disclosure, in order to adapt to the above changes in location information, the acoustic image coordinate module can first detect the sampling frequency (Fs) of the audio data Audio, and then judge whether the audio data Audio and acoustic image coordinate are synchronously input. If no new acoustic image coordinate is input, one or more speakers located in the center of the screen can be selected by default for sound generation. For example, if there is no background sound corresponding to the sound object, two speakers at the center of the screen can be directly selected to play audio data without having to carry out the audio control algorithm described above used to achieve the sound and picture integration. Until an acoustic image coordinate is detected, the acoustic image coordinate module can transmit the received acoustic image coordinate to the subsequent distance comparison process, and store the currently received acoustic image coordinate in the buffer. After receiving the next frame of audio data Audio, if a new acoustic image coordinate is received at the same time, the new acoustic image coordinate will be transferred to the distance comparison module, and the coordinate stored in the buffer will be refreshed at the same time. If no new acoustic image coordinate is received, the acoustic image coordinate stored in the buffer will be transferred to the distance comparison module at the back end.

After receiving the acoustic image coordinate, the distance comparison module can calculate the distances between the acoustic image coordinate and 32 pre-stored speaker coordinates respectively to obtain 32 distances, then compare them, and select 3 speakers with the smallest distances as the loudspeakers. In addition, if two distances are the same, choose either. Next, the output gains of the loudspeakers are determined respectively based on the speaker coordinates of the selected 3 loudspeakers and the acoustic image coordinate, and the output gains of remaining 29 speakers are set to zero. Then, a gain matrix can be obtained based on the output gains of 32 speakers. The gain matrix comprises the output gain of each speaker.

For received audio data, delay processing can be performed first to offset the time consumption of the above gain calculation. Then, the received audio data enters a mixing module Mixture for processing to obtain 32 audio components Audio1_1~Audio1_32. The process of calculating the audio components can refer to the above formula (3).

The implementation process of the audio control method according to the embodiment of the present disclosure is described above for the case of one sound object. It can be understood that the audio control method according to the embodiment of the present disclosure can also be applied to a scenario of multiple sound objects, that is, according to the acoustic image coordinate and audio data of each sound object, the steps S101-S104 described above are carried out respectively, so as to play audio for different sound objects, which will not be repeated here.

According to some embodiments of the present disclosure, obtaining the acoustic image coordinate of the sound object relative to the display screen comprises: making video data comprising the sound object during, wherein the sound object is controlled to move, wherein the display screen is used to output video data; and recording the moving track of the sound object to obtain the acoustic image coordinate.

In some implementations, the video data comprising the sound object can be obtained based on programming software, and the audio data and acoustic image coordinate of the sound object can be recorded during the production process, so as to apply to the audio control method provided according to some embodiments of the present disclosure.

Figure 6:
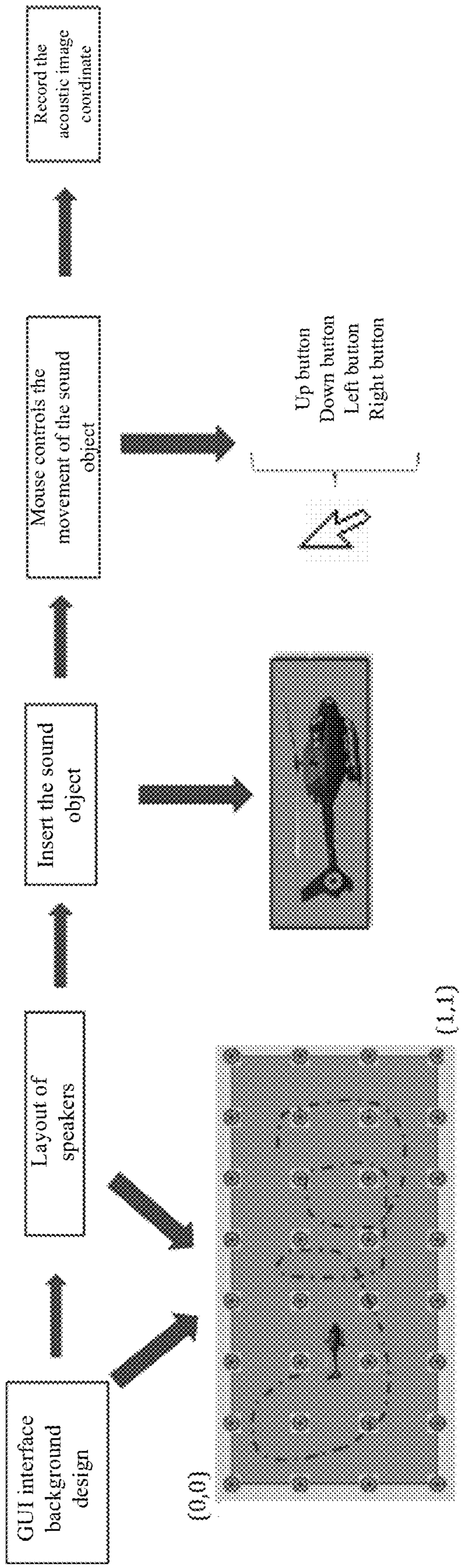
FIG. 6 is a schematic diagram of the implementation process of generating the acoustic image coordinate.

FIG. 6 is a schematic diagram of the implementation process of generating the acoustic image coordinate. In the implementation of FIG. 6, the audio control scheme of the sound and picture integration according to the embodiment of the present disclosure is implemented by programming software. First, by using programming software platforms such as the programming software platforms that are based on python or matlab, calling the sound card of the applicable display screen in real time can be achieved. In addition, graphical user interface (GUI) can also be designed by using programming software to realize an operation interface to generate visual acoustic image data.

First of all, the layout of speakers can be drawn in a designed GUI interface and the coordinates of 32 speakers can be obtained, which will be used for the selection of loudspeakers. Next, a sound object, such as the helicopter shown in FIG. 6, can be inserted in the picture with speakers. Further, the movement of the sound object can be controlled by a mouse through the designed GUI interface. As an example, the sound object can be dragged by the mouse to control the movement, where the position track of the mouse movement can be obtained and the acoustic image coordinate can be obtained based on it. As another example, some buttons can also be designed in the GUI interface to control the movement of the sound object. For example, the button to move up, down, left and right respectively can be set, and the movement of the sound object can be controlled by clicking the button. The movement distance of the button can be preset, that is, click the button once to move a preset distance. Through designing and developing in the GUI interface, the video data comprising the sound object can be finally obtained for playing on the display screen, and the acoustic image coordinate of the sound object in the display process is known. In addition, corresponding audio data is also configured for the sound object in the video data. For example, in the implementation shown in FIG. 6, the audio data can be the sound emitted by the helicopter.

By using the process shown in FIG. 6, the video data comprising the sound object can be produced, wherein the sound object moves during the playback process. During the process of playing the video image, the audio control method provided according to some embodiments of the present disclosure can be used to control the display screen arranged with multiple speakers as shown in FIG. 2 to play the audio data according to the movement track of the sound object. Thus, the speaker playing the audio data and its output gain are changed according to the position coordinate of the sound object, so as to realize the audio-visual effect of the sound and picture integration in real time, and enhance the audio-visual experience of the large-screen display scene, which is conducive to the application and development of products such as the large-display screen.

Figure 7:
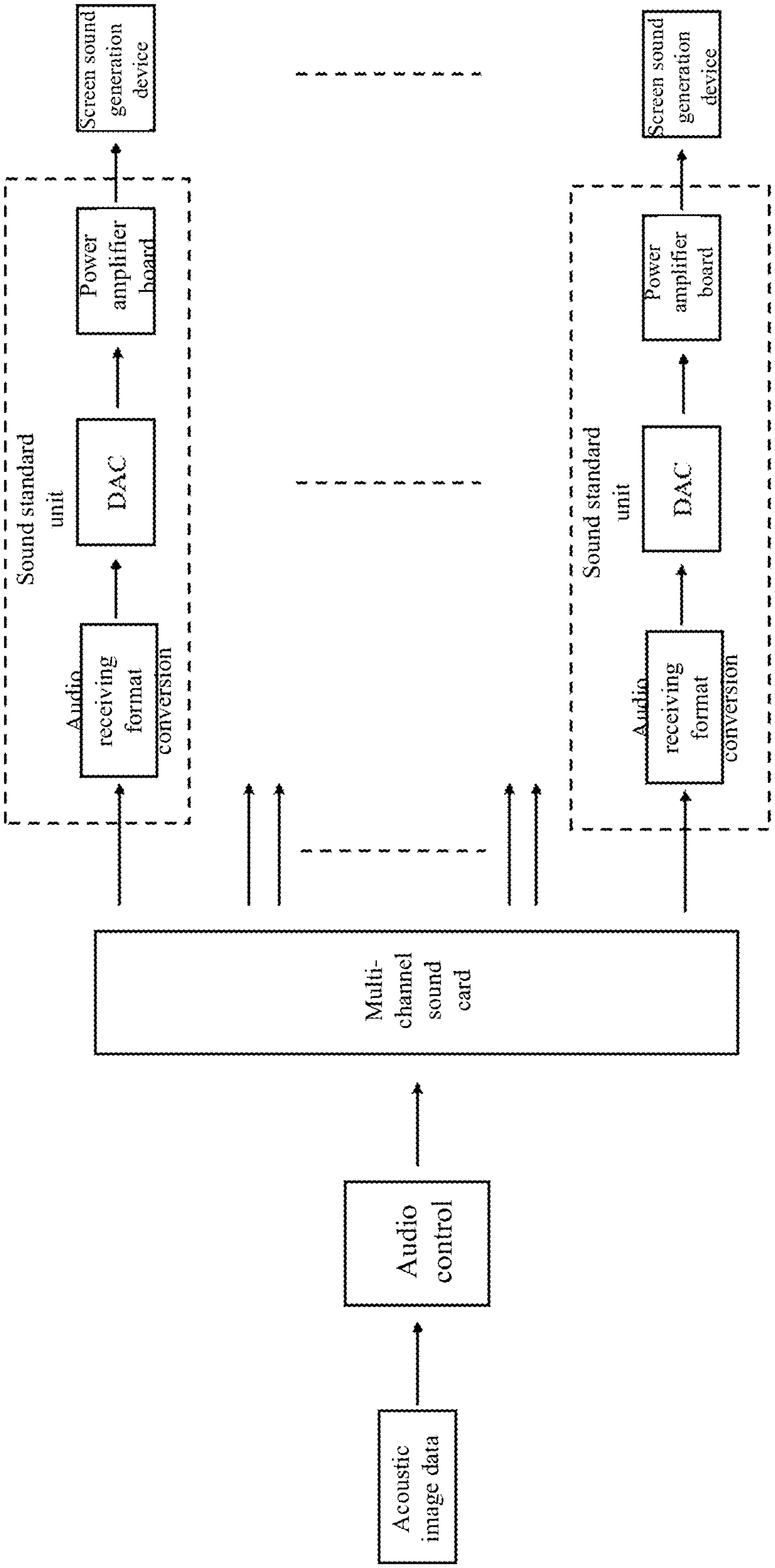
FIG. 7 shows a hardware implementation flow of the audio control method according to some embodiments of the present disclosure.

FIG. 7 is a hardware implementation flow of the audio control method according to some embodiments of the present disclosure. As shown in FIG. 7, first, the acoustic image data is obtained by the audio control module. The acoustic image data comprises the audio data and the position coordinate corresponding to the sound object. The audio control module can refer to the control circuit that can realize the audio control method according to the embodiment of the present disclosure, which can perform the steps S101-S104 described above based on the received acoustic image data, and obtain the audio components Audio1_1 to Audio1_32 that are corresponding to 32 speakers as shown above. Among these 32 audio components, only the output gains of the selected loudspeakers are valid data, while the output gains of other speakers can be 0, for example. In addition, it can be understood that the audio component to be output is synchronized with the position data of the received sound object, that is, a set of output gains are calculated and obtained corresponding to one acoustic image coordinate. Without updating the acoustic image coordinate, it means that the sound object has not been moved, and the loudspeakers and corresponding output gains are shared.

The audio components that are obtained through audio control will enter a multi-channel sound card for playback. Specifically, the multi-channel sound card can be connected with 32 sound standard units, which correspond to the screen sound components in the display screen. For example, each sound standard unit can comprise an audio receiving format conversion unit, a digital to analog converter (DAC), a power amplifier board and other structures, which is not limited here.

Compared with the video data produced by programming software described above in combination with FIG. 6, as another implementation method, the audio control method according to the embodiment of the present disclosure can be applied to existing audio and video files. For example, the sound object file in the audio and video files can be obtained first, and each sound object is read separately. Then, the audio control method according to the embodiment of the present disclosure is used to perform audio control on the acoustic image coordinate file and audio data of the sound object. In addition, before processing, the acoustic image coordinate can also be normalized to match the coordinate of the current display screen. It can be understood that in the process of playing the video pictures, there will be a certain time delay due to the need of audio for audio control processing. The video pictures can be delayed to synchronize with the playback of audio data.

Figure 8:
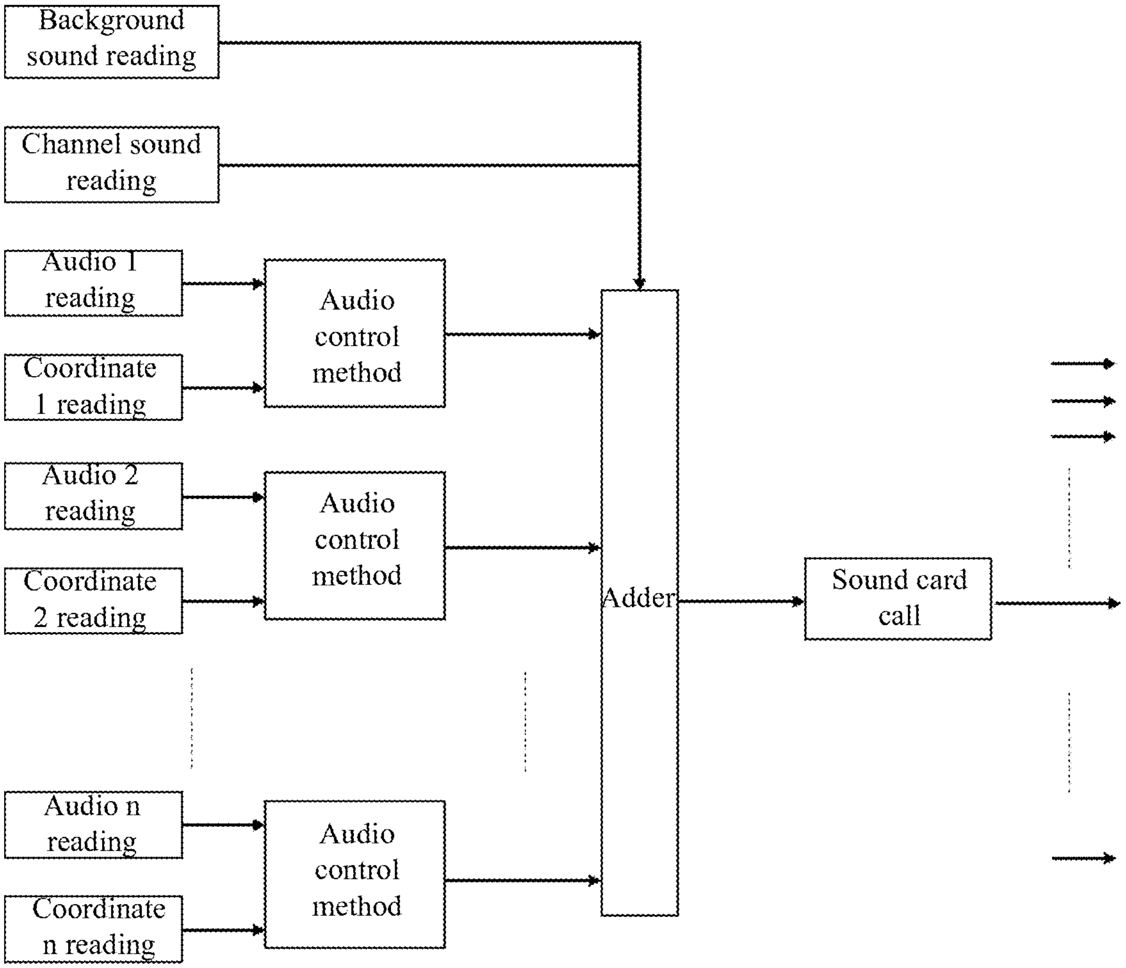
FIG. 8 is a schematic diagram of a player architecture according to some embodiments of the present disclosure.

As an implementation, the audio control method according to the embodiment of the present disclosure can also be configured to build a player software. As an example, a player software with 32 channels can be developed. FIG. 8 is a schematic diagram of a player architecture, where the sound object, channel sound and background sound can be chosen to play.

As shown in FIG. 8, the background sound and channel sound do not need to perform the processing of the audio control method that is used to realize the sound and picture integration, so they can be directly sent to an adder to realize the call of sound cards. For example, all sound cards are called or only one or several sound cards corresponding to the center of the screen are called, which is not limited here. Comparatively, the audio data and the acoustic image coordinate of the sound object need audio control processing. In the example of FIG. 8, the processing process of video data comprising multiple sound objects is schematically shown. For different sound objects, respective audio control process is carried out according to their corresponding acoustic image coordinates and audio data. For example, 3 loudspeakers that are nearest are selected, the initial gains and sound attenuation coefficients are calculated, and the final output gain is obtained. Then, all the audio data to be played need to be processed by the adder to obtain the audio signals that are corresponding to 32 channels and need to be played finally, so as to call the corresponding sound card for audio playback.

As an implementation, the audio control method according to the embodiment of the present disclosure can also be applied to entertainment products, such as game scene playback. In the game scene, there are many kinds of sound objects, such as blasting sound, prompt sound, scene effect sound, etc. These sound objects have corresponding position coordinates in the game design process.

Figure 9:
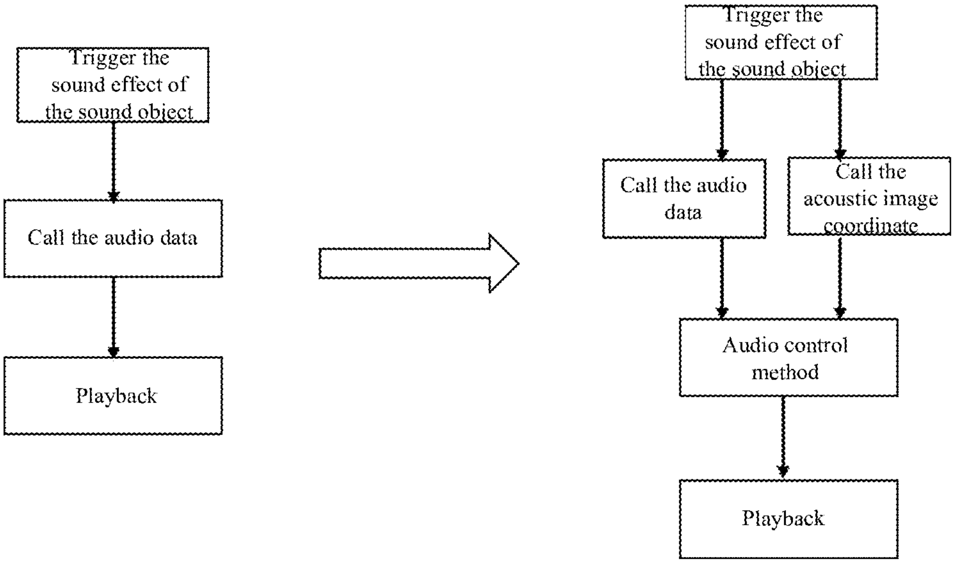
FIG. 9 is an application flowchart of an audio control method according to some embodiments of the present disclosure.

FIG. 9 is an application flow chart of the audio control method according to some embodiments of the present disclosure. The left side of FIG. 9 shows the process in the original game sound effect playing scene, and the user can trigger the sound effect of the sound object during the game process, such as clicking a specific object to obtain a reward. When it is determined that the sound object is triggered, the audio data of the sound object can be called and played, for example, reward prompt sound is played. Comparatively, the right side of FIG. 9 shows a flowchart of applying the audio control method provided according to the embodiment of the present disclosure. As shown in the flowchart on the right side of FIG. 9, first, the sound effect that triggers the sound object is determined, and then the acoustic image coordinate of the sound object is called while the audio data of the sound object is obtained. The acoustic image coordinate is pre-designed during the design process, that is, the acoustic image coordinate is known data. Then, the audio control method according to some embodiments of the present disclosure can be applied. 3 loudspeakers that need to play the audio data are determined first based on the audio data and acoustic image coordinates, then the output gain of each loudspeaker is calculated, and the audio data is played according to calculated output gains, so as to enhance the video sound effect and improve the user experience of large-screen game scenes.

Figure 10:
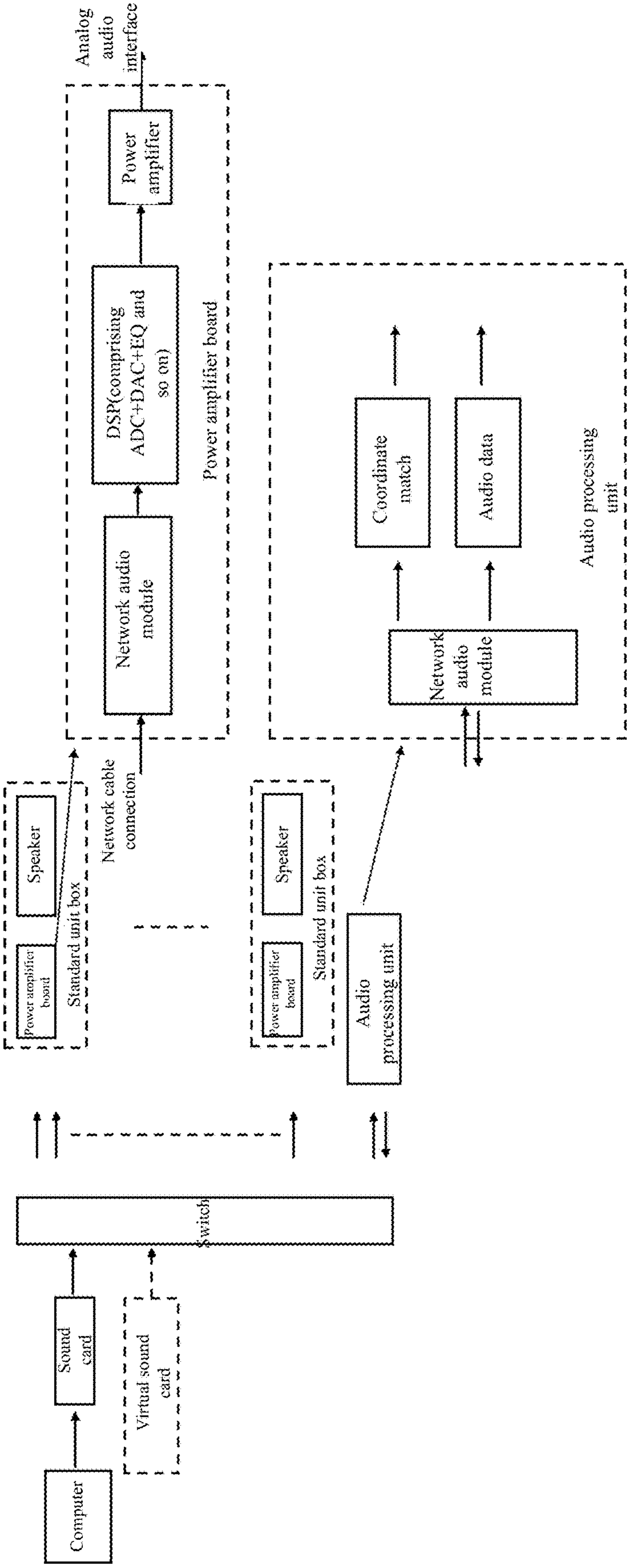
FIG. 10 is a schematic diagram of a driving circuit which applies the audio control method according to the embodiment of the present disclosure.

As an implementation method, the audio control method according to the embodiment of the present disclosure can also be applied to an integrated circuit (IC) to realize the real-time driving control of the acoustic image. FIG. 10 is a schematic diagram of a driving circuit that applies the audio control method according to the embodiment of the present disclosure. Specifically, the audio control method according to the embodiment of the present disclosure can be implemented as a dedicated integrated circuit module to control the audio playback during the display process of the display screen, so as to achieve the effect of the sound and picture integration.

As shown in FIG. 10, the sound card (or virtual sound card) can be controlled by a personal computer (PC) or a dedicated audio playback device, and the audio data can be transmitted to a standard unit box and an audio processing unit through a switch.

Specifically, the standard unit box can comprise, for example, a power amplifier board and a speaker. For example, the number of standard unit boxes can be 32. Ethernet interface can be selected for audio interface, because other audio digital interfaces such as Inter-IC sound (IIS) protocol cannot realize long-distance transmission, and the transmission rate is low, which cannot realize real-time transmission of multi-channel data. Therefore, Ethernet interface and network cable are preferred for audio data transmission. The played sound data can be the audio data corresponding to the sound object or the channel data. The data format of sound data is shown as FIG. 11, which can comprise channel data channel and acoustic image data channel. If it is channel data, it means that the sound is processed in advance or does not need real-time audio control. That is, there is no corresponding acoustic image coordinate (pos). For example, the coordinate of channel data can be set to 0. If it is acoustic image data, it means that real-time audio control is required, that is, the loudspeaker is selected and the output gain is determined. For example, in a game scene, it is necessary to synchronously send the pos data indicating the acoustic image coordinate.

Figure 11:
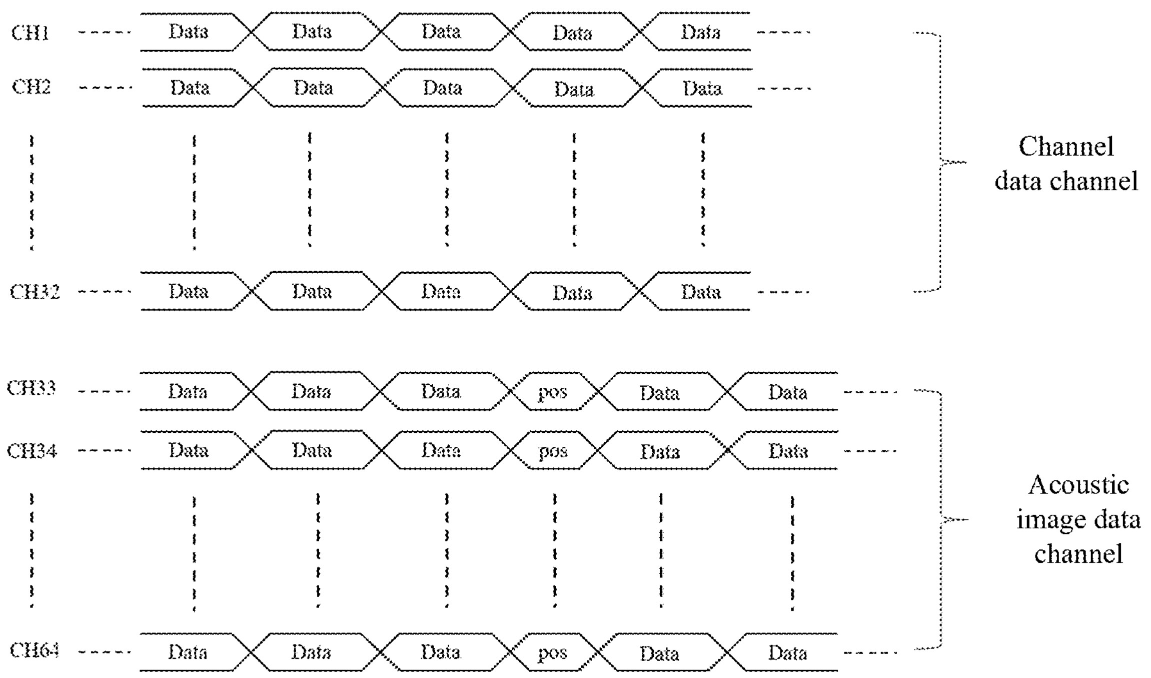
FIG. 11 is a schematic diagram of the data format of sound data.

In addition, considering that the frequency of pos data is generally 60 Hz or 120 Hz, while the frequency of audio data is generally 48 KHz, not every frame of audio data packet is configured with a pos data packet, and 800 or 400 frames of audio are required to be configured with a frame of pos data packet. As an example, configuring according to 400, which can make the transmission speed of audio data faster and save resources. As for channel selection, as shown in FIG. 11, channels 1-32 are conventional channel data, and channels 33-64 are optional channels, which can transmit both channel data and acoustic image data. The format of channel data and the format of acoustic image data are the same. For example, both can be 32 bit data. The distinction between channel data and acoustic image data can be achieved by setting the starting flag bit. As an example, if the channel data is transmitted, the 32 bit data with the value of 0 is transmitted as the flag bit first. If the acoustic image data is transmitted, the 32 bit data with the value of 1 is transmitted as the flag bit first.

Continue to refer to FIG. 10. After the sound data is transmitted to the back end, it can be divided into two situations. The channel data can be directly transmitted through channels 1-32 or directly transmitted to various standard units. As shown in FIG. 10, each standard unit comprises, for example, a power amplifier board and two screen sound components. The power amplifier board comprises a network audio module, a DSP module and a power amplifier module. The network audio module is mainly used to receive the channel data transmitted by the front end, and then transmit it to the back end through IIS or other digital audio protocols after analysis. The DSP module can, for example, perform equalization processing (EQ) after receiving the data, and then convert it into an analog signal to output to the screen sound components.

If the acoustic image data is received, it can be transmitted to channels 33-64, and each sound object can occupy one channel. The channels 33-64 of these 32 sound objects can be output to the audio processing unit, and the audio control method provided according to some embodiments of the present disclosure is implemented in this audio processing unit.

Figure 12:
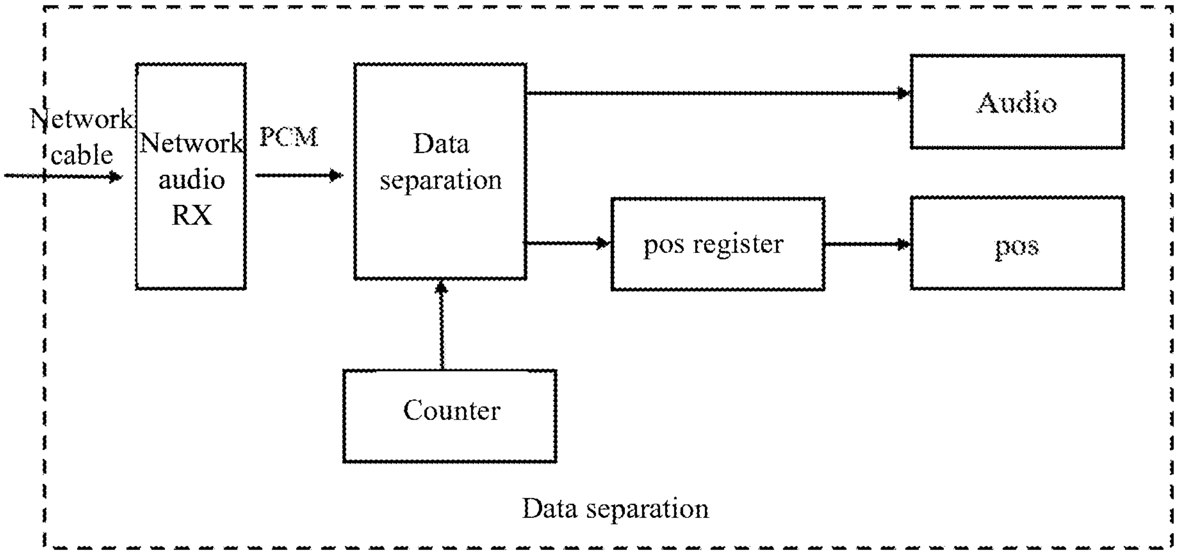
FIG. 12 is a schematic diagram of a data separation module.

Specifically, referring to FIG. 10, the audio processing unit may comprise a network audio module and an audio control unit. For example, after data of channels 33-64 is transmitted through the network cable, it is first parsed by the network audio module and separated into audio data and acoustic image coordinate pos. The data separation module in the network audio module is shown as FIG. 12. After receiving the channel data, the network audio RX module directly converts the received data into PCM (Pulse Code Modulation) format, and PCM data enters the data separation unit.

As described above, the frequency of pos data is generally 60 Hz or 120 Hz, while the frequency of audio data is generally 48 KHz, so not every frame of audio data packet is configured with one pos data packet, and 800 or 400 frames of audio are required to be configured with one frame of pos data packet. As an example, 400 frames of audio are configured with one frame of pos data packet. In this case, in the data separation unit, it will be controlled by a 9-bit counter. When the counter counts to 0-399, it will transmit the position data to a pos register, and at other times, it will output the audio data Audio to the back end. The pos register is set because the general amount of pos data is small, and the back end needs to get the same number of pos data packets as that of the audio data, which is stored in the pos register, so that each frame of audio data Audio gets a corresponding pos data in the pos register.

Figure 13:
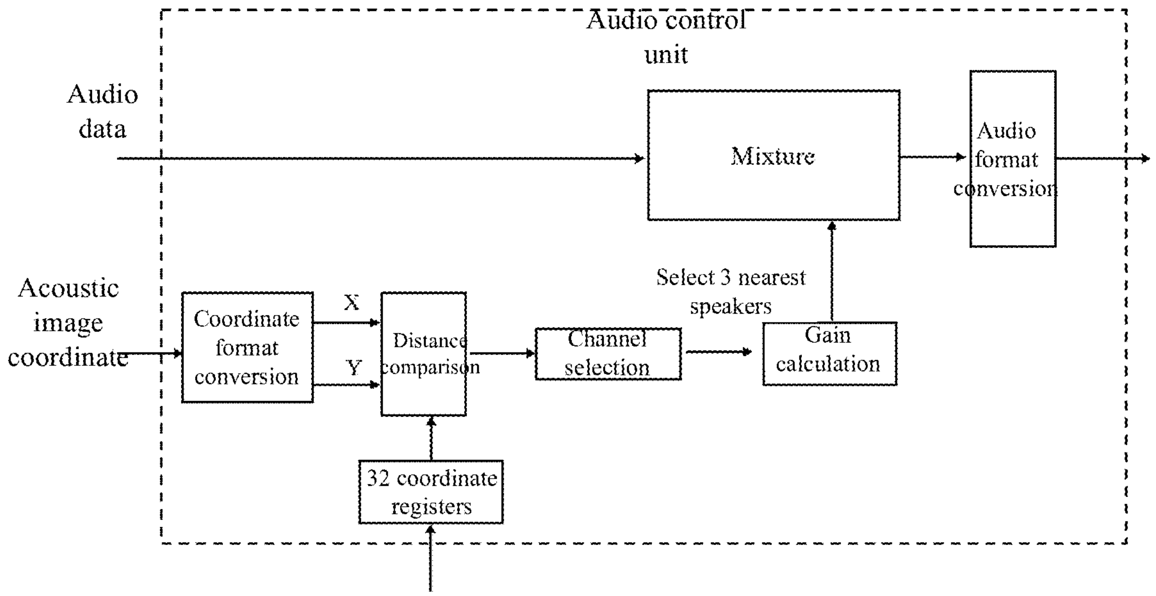
FIG. 13 is a schematic diagram of an audio control unit.

The audio data and acoustic image coordinate pos enter into the audio control unit in FIG. 13 respectively, where the audio data can enter into the mixing module Mixture directly, and the acoustic image coordinate pos will first perform coordinate format conversion. As an example, the first 16 bit represents the horizontal coordinate x, and the last 16 bit represents the vertical coordinate y. After resolving the x and y coordinates, the distances between the coordinates of 32 speakers stored in the register and the x and y coordinates are calculated, and 3 speakers with nearest distances are selected as loudspeakers. Next, the 3 loudspeakers and the acoustic image coordinate pos are input to the gain calculation module together, and the output gains Gain of the 3 loudspeakers are calculated by combining the above gain calculation method described according to the embodiment of the present disclosure, and then enter the mixing module Mixture to be processed with the audio data.

Figure 14A:
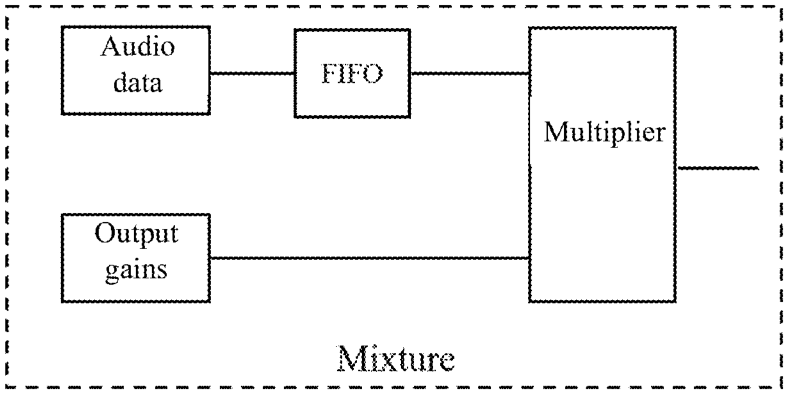
FIG. 14A is a schematic diagram of a mixing module Mixture.
Figure 14B:
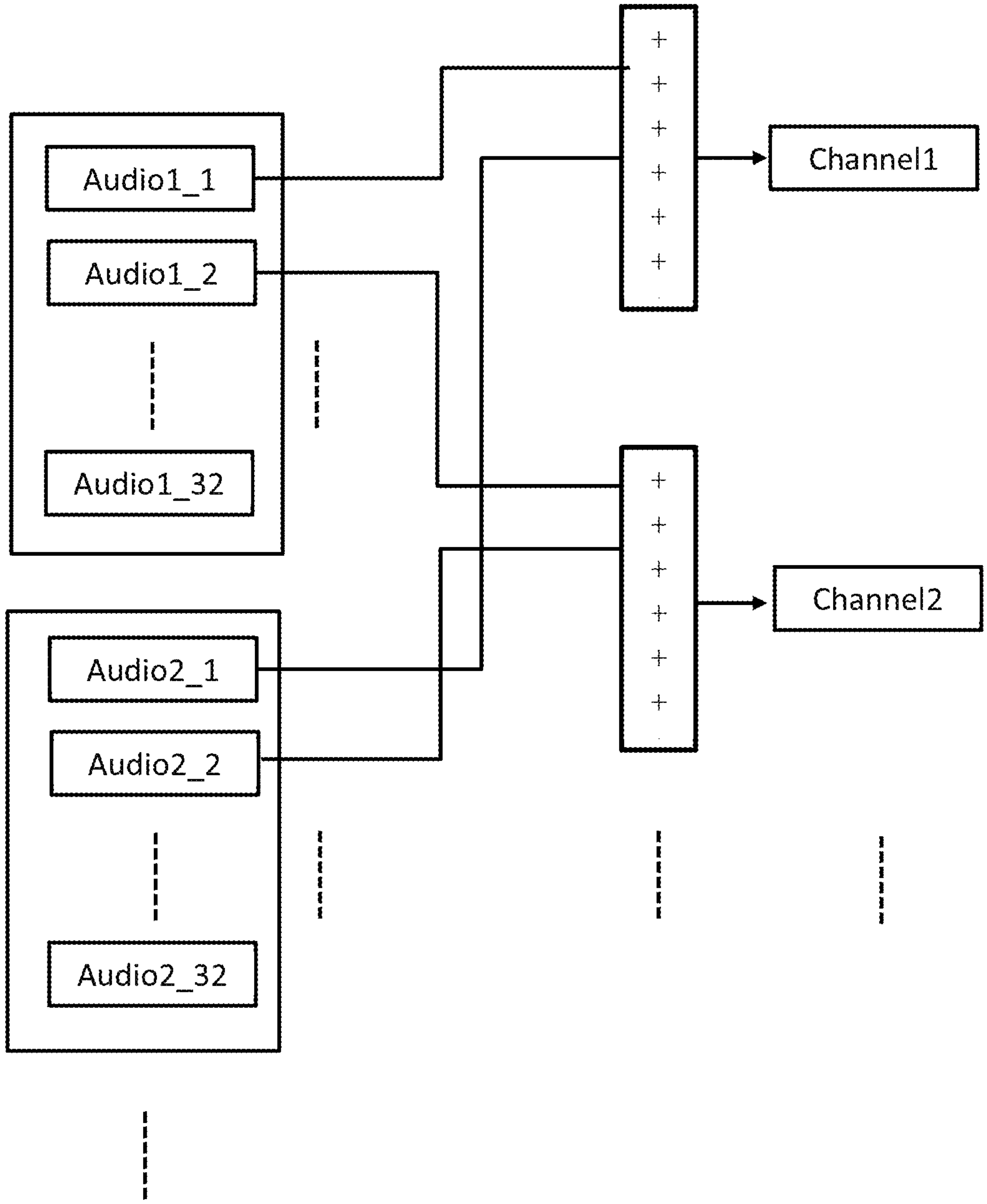
FIG. 14B is a schematic diagram of channel merging.

FIG. 14A is a schematic diagram of a mixing module Mixture. As shown in FIG. 14A, the mixing module Mixture receives audio data and output gains. Next, the audio data is stored by a FIFO module, because the calculation of output gains consumes a certain amount of calculation time, and there will be time delay between the two. In order to synchronize the audio data with the output gains, the audio data can be stored temporarily, and then the two (Audio and Gain) can be multiplied. The specific product process can refer to the above formula (3), where each audio data is multiplied by the gain matrix comprising 32 output gains to obtain 32 audio components. The processing processes of the sound objects corresponding to various channels are similar, so that each sound object can generate 32 audio components. In order to play at the same time, channel merging can be performed on the audio components of each sound object. FIG. 14B is a schematic diagram of channel merging, the same channel data corresponding to the audio components Audio_1 to Audio_32 of the sound object enters the same adder. The adder adds each component corresponding to each sound object. The output of the adder is the data for playback. Then, all data can be transmitted to channels 1-32 for playback.

The audio control method provided according to the embodiment of the present disclosure has been described in detail above in combination with various implementation methods. It can be understood that the audio control method can also be applied to other scenarios, which will not be repeated here.

By using the audio control method according to some embodiments of the present disclosure, the positions of loudspeakers can be accurately determined according to the acoustic image coordinate of the sound object and the coordinates of multiple speakers, and further, the gains of the determined loudspeakers can be adjusted according to the position of the viewer and the sound attenuation coefficients, so as to improve the audio-visual effect of the sound and picture integration on the large screen, which can better realize the surround stereo effect for the sound object, and help improve the viewing experience of large-screen users.

Figure 15:
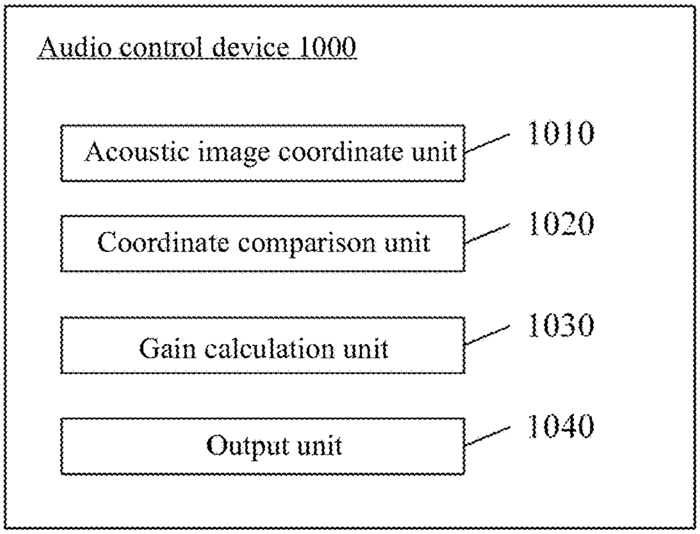
FIG. 15 is a schematic block diagram of an audio control device according to some embodiments of the present disclosure.

According to another aspect of the present disclosure, an audio control device is also provided. FIG. 15 is a schematic block diagram of an audio control device according to the embodiment of the present disclosure. The audio control device according to the embodiment of the present disclosure can be applied to the display screen configured with M speakers, where M is an integer greater than or equal to 2. The layout of speakers in the display screen can refer to FIG. 2 above.

As shown in FIG. 15, the audio control device 1000 may comprise an acoustic image coordinate unit 1010, a coordinate comparison unit 1020, a gain calculation unit 1030, and an output unit 1040.

According to some embodiments of the present disclosure, the acoustic image coordinate unit 1010 can be configured to obtain the acoustic image coordinate of the sound object relative to the display screen; the coordinate comparison unit 1020 can be configured to determine N speakers from M speakers as loudspeakers according to the acoustic image coordinates and the position coordinates of M speakers relative to the display screen, where N is an integer less than or equal to M; the gain calculation unit 1030 can be configured to determine the output gains of N loudspeakers respectively according to the distances between the N loudspeakers and the viewer of the display screen and the sound attenuation coefficients; and the output unit 1040 can be configured to calculate the output audio data of the sound object in the display screen according to the audio data of the sound object and the output gains of N loudspeakers, and control M speakers to play the output audio data.

According to some embodiments of the present disclosure, determining N speakers from M speakers as loudspeakers by the coordinate comparison unit 1020 comprises: calculating the distances between the position coordinates and the acoustic image coordinates of M speakers respectively, and determining the 3 speakers with nearest distances as loudspeakers, where N=3.

According to some embodiments of the present disclosure, determining the output gains of the N loudspeakers respectively according to the distances between the N loudspeakers and the viewer of the display screen and the sound attenuation coefficients by the gain calculation unit 1030 comprises: obtaining N vectors pointing from the viewer to the N loudspeakers; updating the vector modulus of N vectors based on the differences between the vector modulus of N vectors, and using the VBAP algorithm to calculate N initial gains based on the updated N vectors; obtaining N sound attenuation coefficients based on the vector modulus of N vectors, and obtaining N output gains based on the products of N sound attenuation coefficients and N initial gains.

According to some embodiments of the present disclosure, updating the vector modulus of N vectors based on the differences between the vector modulus of N vectors, and using the VBAP algorithm to calculate the N initial gains based on the updated N vectors by the gain calculation unit 1030 comprises: determining the loudspeaker with the largest vector modulus among the N vectors of N loudspeakers, wherein, the loudspeaker with the largest vector modulus is expressed as the first loudspeaker, the vector modulus of the first loudspeaker is expressed as the first vector modulus, and the loudspeakers other than the first loudspeaker among the N loudspeakers are expressed as the second loudspeakers; obtaining an extended vector based on the vector direction of the second loudspeakers and the first vector modulus; and calculating N initial gains based on the vector of the first loudspeaker and the extended vector of the second loudspeakers according to the VBAP algorithm.

According to some embodiments of the present disclosure, obtaining N sound attenuation coefficients respectively based on the vector modulus of N vectors by the gain calculation unit 1030 comprises: for each of the second loudspeakers, calculating the difference r between the vector modulus of the second loudspeakers and the first vector modulus, and calculating the sound attenuation coefficient k based on the difference r according to k=20 log(10, r); and setting the sound attenuation coefficient of the first loudspeaker to 0. Specifically, the process of calculating the output gains of the loudspeakers by the gain calculation unit can refer to the above description in combination with FIG. 3-FIG. 4, which will not be repeated here.

According to some embodiments of the present disclosure, M speakers are equally spaced in the display screen in a form of matrix.

According to some embodiments of the present disclosure, calculating the output audio data of the sound object in the display screen according to the audio data of the sound object and the output gains of N loudspeakers and controlling M speakers to play the output audio data by the output unit 1040, comprises: setting the output gains of the speakers other than the N loudspeakers in the M speakers to 0; and multiplying the audio data with the output gains of M speakers respectively to obtain the output audio data comprising M audio components, and controlling the M speakers to output one of the corresponding M audio components.

According to some embodiments of the present disclosure, multiplying the audio data with the output gains of M speakers respectively by the output unit 1040 comprises: delaying the audio data for a predetermined time interval, and multiplying the delayed audio data with the output gains of M speakers.

According to some embodiments of the present disclosure, obtaining the acoustic image coordinate of the sound object relative to the display screen by the acoustic image coordinate unit 1010, comprises: making video data comprising the sound object, wherein the sound object is controlled to move, wherein the display screen is used for outputting video data; and recording the moving track of the sound object to obtain the acoustic image coordinate. Specifically, the acoustic image coordinate unit 1010 can realize the steps described above in combination with FIG. 6, and obtain the acoustic image coordinate and corresponding audio/video data to apply to the display screen as shown in FIG. 2.

As an example, the above audio control device can be implemented as a circuit structure shown in FIG. 7 or FIG. 10 above. By using the audio control device according to some embodiments of the present disclosure, the position of loudspeakers can be accurately determined according to the acoustic image coordinate of the sound object and the coordinates of a plurality of speakers, and further, the gains of determined loudspeakers can be adjusted according to the position of the viewer and the sound attenuation coefficients, so as to improve the audio-visual effect of the sound and picture integration on the large screen, which can better realize the surround stereo effect for sound objects, and help improve the viewing experience of large-screen users.

Figure 16:
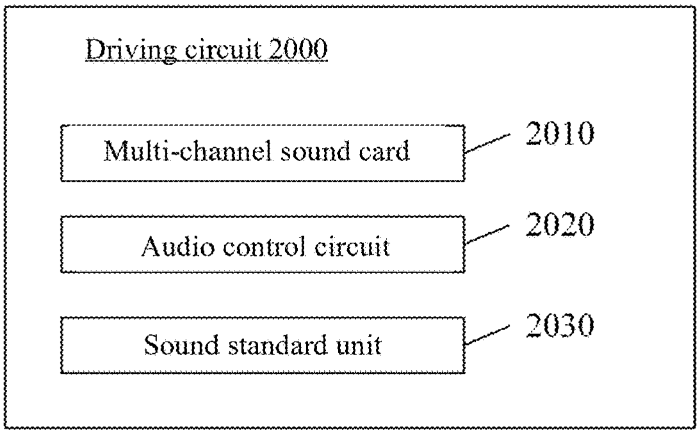
FIG. 16 is a schematic block diagram of a driving circuit according to some embodiments of the present disclosure.

According to another aspect of the present disclosure, a driving circuit based on a multi-channel splicing screen sound system is also provided. FIG. 16 is a schematic block diagram of a driving circuit according to some embodiments of the present disclosure. The driving circuit 2000 may comprise a multi-channel sound card 2010, an audio control circuit 2020, and a sound standard unit 1030.

According to some embodiments of the present disclosure, the multi-channel sound card 2010 can be configured to receive sound data, wherein the sound data comprises channel data and acoustic image data, wherein the acoustic image data comprises audio data and the coordinate of the sound object. The audio control circuit 2020 can be configured to obtain the output audio data of the sound object in the display screen according to the audio control method described above. The sound standard unit 2030 can comprise a power amplifier board and a screen sound components. The sound standard unit can be configured to output channel data and output audio data. For the specific implementation structure of the driving circuit, please refer to the above description of FIG. 10, which will not be repeated here.

Figure 17:
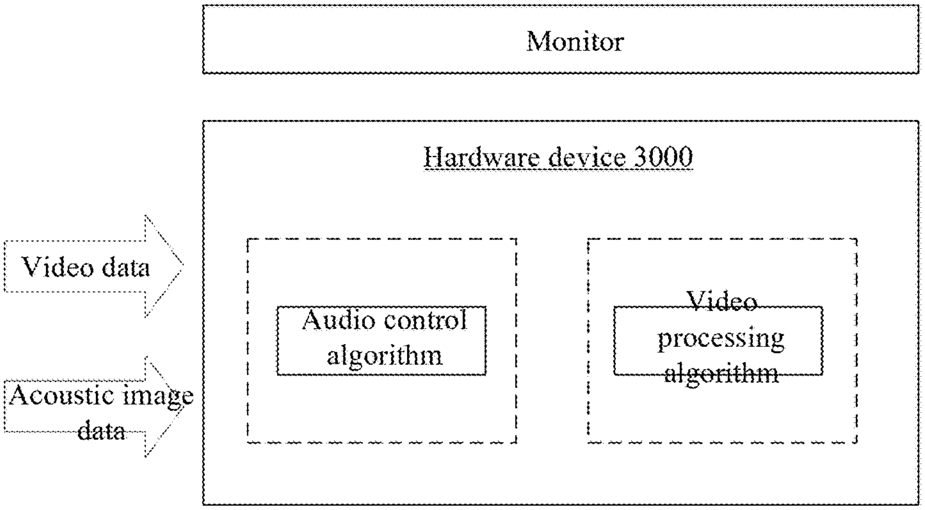
FIG. 17 is a schematic block diagram of a hardware device according to some embodiments of the present disclosure.

As an implementation method, FIG. 17 is a schematic block diagram of a hardware device according to some embodiments of the present disclosure. As shown in FIG. 17, the hardware device 3000 can be used as the driving circuit of a monitor. Specifically, it can accept video data and acoustic image data for display, wherein the acoustic image data can comprise the channel data for direct playback. Or it can also comprise acoustic image data which refers to the data corresponding to the sound object. The number of sound objects can be one or more, which will not be limited here. The acoustic image data comprises both audio data and the position coordinate of the sound object. The hardware device processes the acoustic image data by implementing the audio control algorithm provided according to the embodiment of the present disclosure. The hardware device can also use video processing algorithms to process video data, such as decoding. Then, the hardware device can transmit the processed data to the monitor for video display and audio playback, so as to achieve the audio-visual effect of the sound and picture integration.

According to another aspect of the present disclosure, a non-volatile computer-readable storage medium is also provided, on which instructions are stored. The instructions cause the processor to execute the audio control method described above when executed by the processor.

Figure 18:
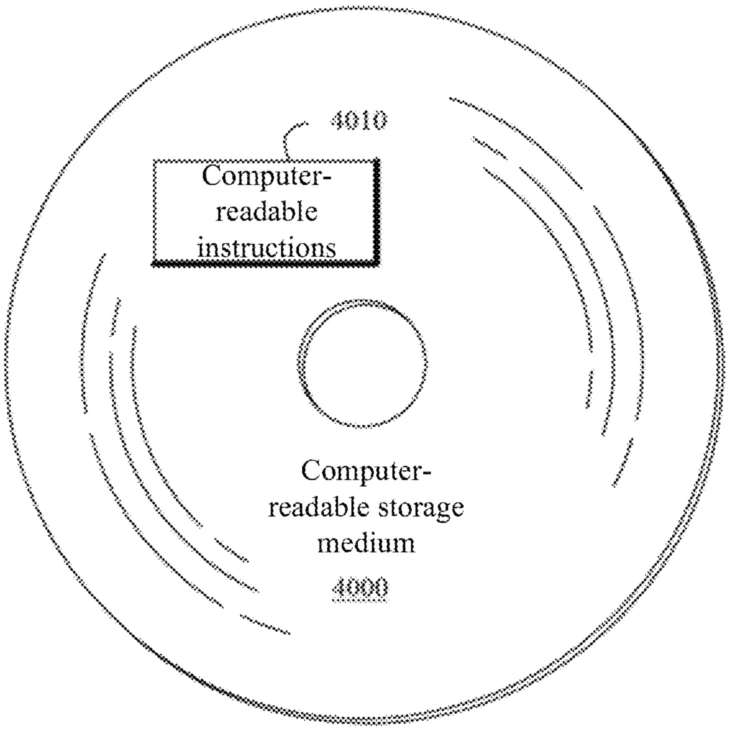
FIG. 18 is a schematic diagram of a non-volatile computer-readable storage medium according to some embodiments of the present disclosure.

As shown in FIG. 18, computer-readable instructions 4010 are stored on the computer-readable storage medium 4000. When the computer-readable instructions 4010 are run by the processor, the audio control method described with reference to the above drawings may be executed. The computer-readable storage medium comprises but is not limited to, for example, volatile memory and/or non-volatile memory. The volatile memory may comprise, for example, random access memory (RAM) and/or cache memory (cache), etc. The non-volatile memory may comprise, for example, read-only memory (ROM), hard disk, flash memory, etc. For example, the computer-readable storage medium 4000 can be connected to a computing device such as a computer, and then, when the computing device runs the computer-readable instructions 4010 stored on the computer storage medium 4000, the audio control method provided according to the embodiment of the present disclosure described above can be performed.

Those skilled in the art can understand that the contents disclosed in the present disclosure may have many variations and improvements. For example, the various devices or components described above can be implemented by hardware, software, firmware, or some or all of the three.

In addition, although the present disclosure makes various references to some units in the system according to the embodiments of the present disclosure, any number of different units can be used and run on clients and/or servers. The units are only illustrative, and different aspects of the system and method can use different units.

Those skilled in the art can understand that all or part of the steps in the above method can be completed by instructing the relevant hardware through a program, and the program can be stored in a computer-readable storage medium, such as read-only memory, magnetic disk or optical disk. Optionally, all or part of the steps of the above embodiments can also be implemented by using one or more integrated circuits. Accordingly, each module/unit in the above embodiments can be implemented in the form of hardware or software function modules. The present disclosure is not limited to any combination of specific forms of hardware and software.

Unless otherwise defined, all terms (comprising technical and scientific terms) used herein have the same meaning as those commonly understood by those skilled in the art to which this disclosure belongs. It should also be understood that terms such as those defined in the general dictionary should be interpreted as having the meaning consistent with their meaning in the context of the relevant technology, and should not be interpreted in the sense of idealization or extreme formalization, unless explicitly defined here.

The above is a description of the present disclosure and should not be considered as a limitation thereof. Although several exemplary embodiments of the present disclosure have been described, those skilled in the art will easily understand that many modifications can be made to the exemplary embodiments without departing from the novel teaching and advantages of the present disclosure. Therefore, all these modifications are intended to be comprised in the scope of the disclosure defined by the claims. It should be understood that the above is a description of the present disclosure, and should not be considered as limited to the specific embodiments disclosed, and the modification intention of the disclosed embodiments and other embodiments is comprised in the scope of the appended claims. The present disclosure is limited by the claims and their equivalents.

What is claimed is:

1. An audio control method, which is applicable to a display screen configured with M speakers, wherein, M is an integer greater than or equal to 2, and the method comprises:

obtaining a sound image coordinate of a sound object relative to the display screen;

determining N speakers from the M speakers as loudspeakers according to the sound image coordinate and position coordinates of the M speakers relative to the display screen, wherein N is an integer less than or equal to M;

determining output gains of the N loudspeakers according to distances between the N loudspeakers and a viewer of the display screen and sound attenuation coefficients; and calculating output audio data of the sound object in the display screen according to audio data of the sound object and the output gains of the N loudspeakers, and controlling the M speakers to play the output audio data.

2. The method according to claim 1, wherein, determining the N speakers from the M speakers as the loudspeakers comprises:

calculating distances between the position coordinates of the M speakers and the sound image coordinate, and determining 3 speakers with nearest distances as the loudspeakers, wherein N=3.

3. The method according to claim 1, wherein, determining the output gains of the N loudspeakers according to the distances between the N loudspeakers and the viewer of the display screen and the sound attenuation coefficients comprises:

obtaining N vectors pointed from the viewer to the N loudspeakers;

updating vector modulus of the N vectors based on differences between the vector modulus of the N vectors, and using a vector-base amplitude panning algorithm to calculate N initial gains based on updated N vectors; and obtaining N sound attenuation coefficients respectively based on the vector modulus of the N vectors, and obtaining N output gains based on a product of the N sound attenuation coefficients and the N initial gains.

4. The method according to claim 3, wherein, updating the vector modulus of the N vectors based on the differences between the vector modulus of the N vectors, and using the vector-base amplitude panning algorithm to calculate the N initial gains based on the updated N vectors, comprises:

determining a loudspeaker with a largest vector modulus among the N vectors of the N loudspeakers, wherein the loudspeaker with the largest vector modulus is represented as a first loudspeaker, a vector modulus of the first loudspeaker is represented as a first vector modulus, and loudspeakers other than the first loudspeaker among the N loudspeakers are represented as second loudspeakers;

obtaining extended vectors based on vector directions of the second loudspeakers and the first vector modulus; and calculating N initial gains based on a vector of the first loudspeaker and the extended vectors of the second loudspeakers according to the vector-base amplitude panning algorithm.

5. The method according to claim 4, wherein, obtaining the N sound attenuation coefficients respectively based on the vector modulus of the N vectors comprises:

for each of the second loudspeakers, calculating a difference d between vector modulus of the second loudspeakers and the first vector modulus, and calculating a sound attenuation coefficient k according to k=20 log(10, d) based on the difference d; and setting a sound attenuation coefficient of the first loudspeaker to be 0.

6. The method according to claim 1, wherein the M speakers are equally spaced in the display screen in a form of matrix.

7. The method according to claim 1, wherein, calculating the output audio data of the sound object in the display screen according to the audio data of the sound object and the output gains of the N loudspeakers, and controlling the M speakers to play the output audio data, comprises:

setting output gains of speakers other than the N loudspeakers among the M speakers to be 0; and multiplying the audio data with output gains of the M speakers respectively, to obtain output audio data comprising M audio components, and controlling the M speakers to output one of corresponding M audio components respectively.

8. The method according to claim 7, wherein, multiplying the audio data with the output gains of the M speakers respectively comprises:

delaying the audio data for a predetermined time interval, and multiplying delayed audio data with the output gains of the M speakers.

9. The method according to claim 1, wherein, obtaining the sound image coordinate of the sound object relative to the display screen comprise:

making video data comprising the sound object, wherein the sound object is controlled to move, wherein the display screen is used to output the video data; and recording moving track of the sound object to obtain the sound image coordinate.

10. An audio control device, wherein, the device is applicable for a display screen equipped with M speakers, M is an integer greater than or equal to 2, and the device comprises:

a sound image coordinate unit which is configured to obtain a sound image coordinate of a sound object relative to the display screen;

a coordinate comparison unit which is configured to determine N speakers from the M speakers as loudspeakers according to the sound image coordinate and position coordinates of the M speakers relative to the display screen, wherein, N is an integer less than or equal to M;

a gain calculation unit which is configured to determine output gains of the N loudspeakers according to distances between the N loudspeakers and a viewer of the display screen and sound attenuation coefficients; and an output unit which is configured to calculate output audio data of the sound object in the display screen according to audio data of the sound object and the output gains of the N loudspeakers, and controlling the M speakers to play the output audio data.

11. The device according to claim 10, wherein, determining the N speakers from the M speakers as the loudspeakers by the coordinate comparison unit comprises:

calculating distances between the position coordinates of the M speakers and the sound image coordinate, and determining 3 speakers with nearest distances as the loudspeakers, wherein N=3.

12. The device according to claim 10, wherein, determining the output gains of the N loudspeakers according to the distances between the N loudspeakers and the viewer of the display screen and the sound attenuation coefficients by the gain calculation unit comprises:

obtaining N vectors pointed from the viewer to the N loudspeakers;

updating vector modulus of the N vectors based on differences between the vector modulus of the N vectors, and using a Vector-Base Amplitude Panning (VBAP) algorithm to calculate N initial gains based on updated N vectors; and obtaining N sound attenuation coefficients respectively based on the vector modulus of the N vectors, and obtaining N output gains based on a product of the N sound attenuation coefficients and the N initial gains.

13. The device according to claim 12, wherein, updating the vector modulus of the N vectors based on the differences between the vector modulus of the N vectors, and using the vector-base amplitude panning algorithm to calculate the N initial gains based on the updated N vectors by the gain calculation unit, comprises:

determining a loudspeaker with a largest vector modulus among the N vectors of the N loudspeakers, wherein the loudspeaker with the largest vector modulus is represented as a first loudspeaker, a vector modulus of the first loudspeaker is represented as a first vector modulus, and loudspeakers other than the first loudspeaker among the N loudspeakers are represented as second loudspeakers;

obtaining extended vectors based on vector directions of the second loudspeakers and the first vector modulus; and calculating N initial gains based on a vector of the first loudspeaker and the extended vectors of the second loudspeakers according to the vector amplitude translation algorithm.

14. The device according to claim 13, wherein, obtaining the N sound attenuation coefficients respectively based on the vector modulus of the N vectors by the gain calculation unit comprises:

for each of the second loudspeakers, calculating a difference d between vector modulus of the second loudspeakers and the first vector modulus, and calculating a sound attenuation coefficient k according to k=20 log(10, d) based on the difference d; and setting a sound attenuation coefficient of the first loudspeaker to be 0.

15. The device according to claim 10, wherein the M speakers are equally spaced in the display screen in a form of matrix.

16. The device according to claim 10, wherein, calculating the output audio data of the sound object in the display screen according to the audio data of the sound object and the output gains of the N loudspeakers, and controlling the M speakers to play the output audio data by the output unit comprises:

setting output gains of speakers other than the N loudspeakers among the M speakers to be 0; and multiplying the audio data with output gains of the M speakers respectively, to obtain output audio data comprising M audio components, and controlling the M speakers to output one of corresponding M audio components respectively.

17. The device according to claim 16, wherein, multiplying the audio data with the output gains of the M speakers respectively by the output unit comprises:

delaying the audio data for a predetermined time interval, and multiplying delayed audio data with the output gains of the M speakers.

18. The device according to claim 10, wherein, obtaining the sound image coordinate of the sound object relative to the display screen by the sound image coordinate unit comprises:

making video data comprising the sound object, wherein the sound object is controlled to move, wherein the display screen is used to output the video data; and recording moving track of the sound object to obtain the sound image coordinate.

19. A driving circuit based on multi-channel splicing screen sound system, wherein, the driving circuit comprises:

a multi-channel sound card which is configured to receive sound data, wherein the sound data comprises sound channel data and sound image data, wherein, the sound image data comprises audio data and a coordinate of a sound object;

an audio control circuit which is configured to obtain output audio data of the sound object in the display screen according to the audio control method described in claim 1; and a sound standard unit, wherein the sound standard unit comprises a power amplifier board and a screen sound components, and the sound standard unit is configured to output the channel data and the output audio data.

20. A non-transitory computer-readable storage medium on which instructions are stored, wherein the instructions causes the processor to execute the audio control method described in claim 1 when executed by the processor.

* * * * *